United States Patent
Teising et al.

(10) Patent No.: US 10,840,033 B2
(45) Date of Patent: *Nov. 17, 2020

(54) TAP CHANGER WITH AN IMPROVED MONITORING SYSTEM

(71) Applicant: ABB Power Grids Switzerland AG, Baden (CH)

(72) Inventors: William James Teising, Jackson, TN (US); Robert Alan Elick, Jackson, TN (US)

(73) Assignee: ABB Power Grids Switzerland AG, Baden (CH)

( * ) Notice: Subject to any disclaimer, the term of this patent is extended or adjusted under 35 U.S.C. 154(b) by 393 days.

This patent is subject to a terminal disclaimer.

(21) Appl. No.: 15/611,124

(22) Filed: Jun. 1, 2017

(65) Prior Publication Data
US 2017/0271097 A1    Sep. 21, 2017

Related U.S. Application Data

(63) Continuation of application No. 14/036,742, filed on Sep. 25, 2013, now Pat. No. 9,697,962, which is a (Continued)

(51) Int. Cl.
*H01H 9/00* (2006.01)
*H01H 3/60* (2006.01)
(Continued)

(52) U.S. Cl.
CPC ............ *H01H 9/0027* (2013.01); *H01H 3/30* (2013.01); *H01H 3/54* (2013.01); *H01H 3/605* (2013.01);
(Continued)

(58) Field of Classification Search
CPC .. H02J 3/00; H01H 33/66; H01H 3/54; H01H 9/0033; H01H 9/0036; H01H 2009/00618;
(Continued)

(56) References Cited

U.S. PATENT DOCUMENTS 3,524,033 A    8/1970  Schoendube
3,602,807 A    8/1971  Prescott
(Continued)

FOREIGN PATENT DOCUMENTS

DE    1640206    5/1970
DE    4009038    3/1990
(Continued)

OTHER PUBLICATIONS

Heidenhain, "EncoderParts Manual", Jan. 2004, 56 pgs.
(Continued)

*Primary Examiner* — Arnold M Kinkead
(74) *Attorney, Agent, or Firm* — Sage Patent Group

(57) ABSTRACT

An on-load tap changer is provided having a plurality of modules, each of which is operable to change taps in a transformer winding. The tap changer includes a motor connected to rotate at least one shaft. The at least one shaft is connected to the tap change modules and is operable upon rotation to cause the tap change modules to each perform a sequence of operations that effectuate a tap change. A multi-turn absolute encoder is connected to the at least one shaft. A monitoring system is connected to the encoder and is operable to determine from the position of the at least one shaft where the tap change modules are in the sequence of operations.

20 Claims, 21 Drawing Sheets

Related U.S. Application Data continuation of application No. PCT/US2012/030734, filed on Mar. 27, 2012.

(60) Provisional application No. 61/468,060, filed on Mar. 27, 2011.

(51) Int. Cl.
  *H01H 3/30* (2006.01)
  *H01H 33/66* (2006.01)
  *H01H 3/54* (2006.01)
  *H02J 3/00* (2006.01)

(52) U.S. Cl.
  CPC .......... *H01H 9/0005* (2013.01); *H01H 33/66* (2013.01); *H02J 3/00* (2013.01); *H01H 9/0033* (2013.01); *H01H 9/0038* (2013.01); *H01H 2009/0061* (2013.01); *Y10T 307/911* (2015.04)

(58) Field of Classification Search
  CPC .... H01H 9/0011; H01H 9/0027; H01H 3/605; H01H 3/30; H01H 9/0005; H01H 9/0038; H01H 2009/0061; Y10T 307/911; H02P 7/20
  USPC .............. 323/255, 256, 257, 258, 234, 247; 307/17; 318/696
  See application file for complete search history.

(56) References Cited

U.S. PATENT DOCUMENTS

| | | |
|---|---|---|
| 3,622,867 A | 11/1971 | Topper et al. |
| 3,720,867 A | 3/1973 | Rathbun |
| 3,735,243 A | 5/1973 | Downs et al. |
| 3,819,892 A | 6/1974 | Rathbun |
| 4,061,963 A | 12/1977 | Green |
| 4,090,225 A | 5/1978 | Gilker et al. |
| 5,128,605 A | 7/1992 | Dohnal et al. |
| 5,428,551 A | 6/1995 | Trainor et al. |
| 5,736,827 A | 4/1998 | Dohnal et al. |
| 5,821,716 A | 10/1998 | Okanik |
| 6,060,669 A | 5/2000 | Dohnal et al. |
| 6,100,674 A | 8/2000 | Dohnal |
| 6,124,726 A | 9/2000 | Dohnal et al. |
| 6,529,858 B1 | 3/2003 | Dohnal et al. |
| 6,965,217 B2 | 11/2005 | Dohnal et al. |
| 7,145,760 B2 | 12/2006 | Stenestam et al. |
| 7,417,411 B2 | 8/2008 | Hoffman et al. |
| 7,463,010 B2 | 12/2008 | Dohnal |
| 8,643,221 B2 | 2/2014 | Armstrong |
| 9,183,998 B2 | 11/2015 | Elick |
| 2010/0207599 A1 | 8/2010 | Blomquist et al. |

FOREIGN PATENT DOCUMENTS

| | | |
|---|---|---|
| DE | 19746574 | 10/1997 |
| DE | 10315206 | 10/2004 |
| DE | 10333010 | 3/2005 |
| EP | 0667009 | 8/1995 |
| EP | 907192 | 4/1998 |
| EP | 1404000 | 3/2004 |
| JP | S60176213 | 9/1985 |
| JP | S60177608 | 9/1985 |
| JP | H07153635 | 6/1995 |
| WO | 0192978 | 12/2001 |
| WO | 2008024048 | 2/2008 |
| WO | 2012135209 | 10/2012 |
| WO | 2012135213 | 10/2012 |

OTHER PUBLICATIONS

Handbuch, "Sew Encoder Systems Manual", Aug. 6, 1999, 44 pgs.
Seifert, Dieter et al. "Torque Motor zum Antrieb eines Stufenschalters", Mar. 16, 2004, 89 pgs.
Seifert, Dieter et al. "Torque-Motor als Ersatz zum Konventionellen Kraftspeicherantrieb von Stufenschaltern", Jan. 2006, 103 pgs.
Incon, "1292KS Synchro Rotary Position Transmitter with Optional Mounting Bracket and Surge Suppression", Feb. 6, 1997, 3pgs.
Dohnal, Dieter, "On-Load Tap-Changers for Power Transformers". Mr. Knowlege Base, Maschinenfabrik Reinhausen GmbH 2013, 24 pgs.
Notice of Opposition, EP Application No. 12712641.1, Aug. 28, 2015, 25 pgs.
Reply of the Patent Proprietor to the Notice of Opposition, EP Application No. 12712841.1, Apr. 6, 2016, 17 pgs.
Response to the Patent Owner's Statement of Apr. 6, 2016 Regarding Notice of Opposition, EP Application No. 12712841.1, Sep. 6, 2013, 13 pgs.
Teising, William James, Tap Changer with an Improved Drive System, U.S. Appl. No. 14/036,685, filed Sep. 25, 2013, US-11028-PRK, Assignee: ABB Technology AG; USPTO.
Maschinenfabrik Reinhausen, "On-Load Tap-Changer RMV-A 600 A / 1320 A", 2161246/00EN.F0209700-TL8001.03, May 2010, Regensburg, Germany.

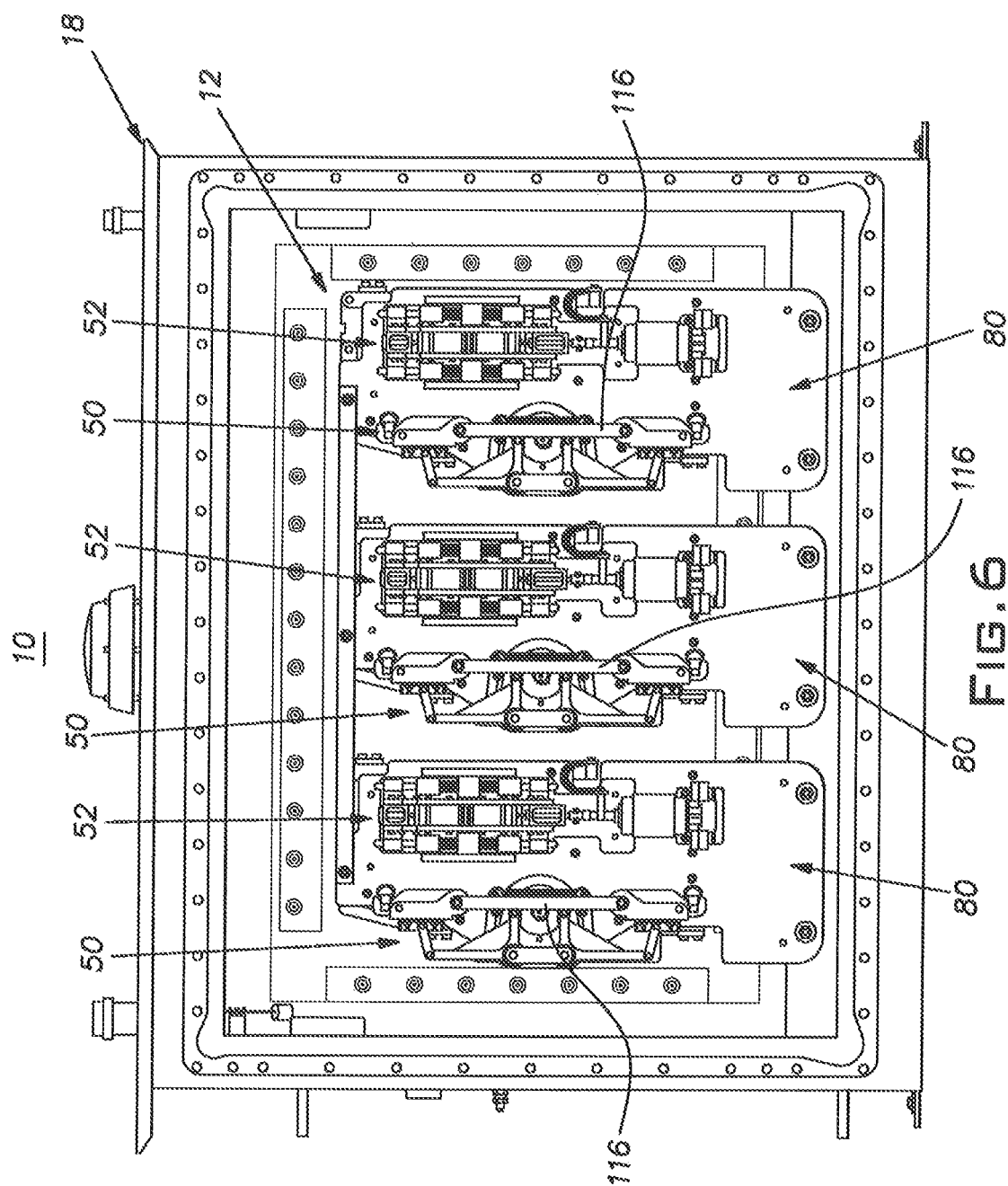

ced to rotate at least one shaft. The at least one shaft is connected to the tap change module and is operable upon rotation to cause the tap change module to perform a sequence of operations that effectuate a tap change. The operations include actuating the bypass switch assembly, actuating the vacuum interrupter assembly and actuating the selector switch assembly. A multi-turn absolute encoder is connected to the at least one shaft and is operable to determine a position of the at least one shaft. A monitoring system is connected to the encoder to receive the position of the at least one shaft and is operable to perform a method of monitoring a tap change. The method includes determining from the position of the at least one shaft where the tap change module is in the sequence of operations.

TAP CHANGER WITH AN IMPROVED MONITORING SYSTEM

CROSS-REFERENCE TO RELATED APPLICATION

This application is a continuation application, under 35 U.S.C. § 120, of copending U.S. patent application Ser. No. 14/036,742 filed on Sep. 25, 2013, now issued as U.S. Pat. No. 9,697,962 on Jul. 4, 2017, which is a continuation of International Patent Application No. PCT/US2012/030734, having a filing date of Mar. 27, 2012, which claims the benefit of U.S. Provisional Application No. 61/468,060, filed on Mar. 27, 2011, each of which is hereby incorporated by reference in its entirety.

BACKGROUND OF THE INVENTION

This invention relates to tap changers and more particularly to load tap changers.

As is well known, a transformer converts electricity at one voltage to electricity at another voltage, either of higher or lower value. A transformer achieves this voltage conversion using a primary winding and a secondary winding, each of which are wound on a ferromagnetic core and comprise a number of turns of an electrical conductor. The primary winding is connected to a source of voltage and the secondary winding is connected to a load. By changing the ratio of secondary turns to primary turns, the ratio of output to input voltage can be changed, thereby controlling or regulating the output voltage of the transformer. This ratio can be changed by effectively changing the number of turns in the primary winding and/or the number of turns in the secondary winding. This is accomplished by making connections between different connection points or "taps" within the winding(s). A device that can make such selective connections to the taps is referred to as a "tap changer".

Generally, there are two types of tap changers: on-load tap changers and de-energized or "off-load" tap changers. An off-load tap changer uses a circuit breaker to isolate a transformer from a voltage source and then switches from one tap to another. An on-load tap changer (or simply "load tap changer") switches the connection between taps while the transformer is connected to the voltage source. A load tap changer may include, for each phase winding, a selector switch assembly, a bypass switch assembly and a vacuum interrupter assembly. The selector switch assembly makes connections to taps of the transformer, while the bypass switch assembly connects the taps, through two branch circuits, to a main power circuit. During a tap change, the vacuum interrupter assembly safely isolates a branch circuit. A drive system moves the selector switch assembly, the bypass switch assembly and the vacuum interrupter assembly. The operation of the selector switch assembly, the bypass switch assembly and the vacuum interrupter assembly are interdependent and carefully choreographed. The present invention is directed to a monitoring system for monitoring these operations.

SUMMARY OF THE INVENTION

In accordance with the present invention, an on-load tap changer is provided for making tap changes in a transformer winding. The tap changer includes a tap change module connected to the transformer winding. The tap change module includes a bypass switch assembly, a vacuum interrupter assembly and a selector switch assembly. A motor is

BRIEF DESCRIPTION OF THE DRAWINGS

The features, aspects, and advantages of the present invention will become better understood with regard to the following description, appended claims, and accompanying drawings where:

FIG. 6 shows a front view of the interior of a tank of the tap changer;

DETAILED DESCRIPTION OF ILLUSTRATIVE EMBODIMENTS

Figure 1:
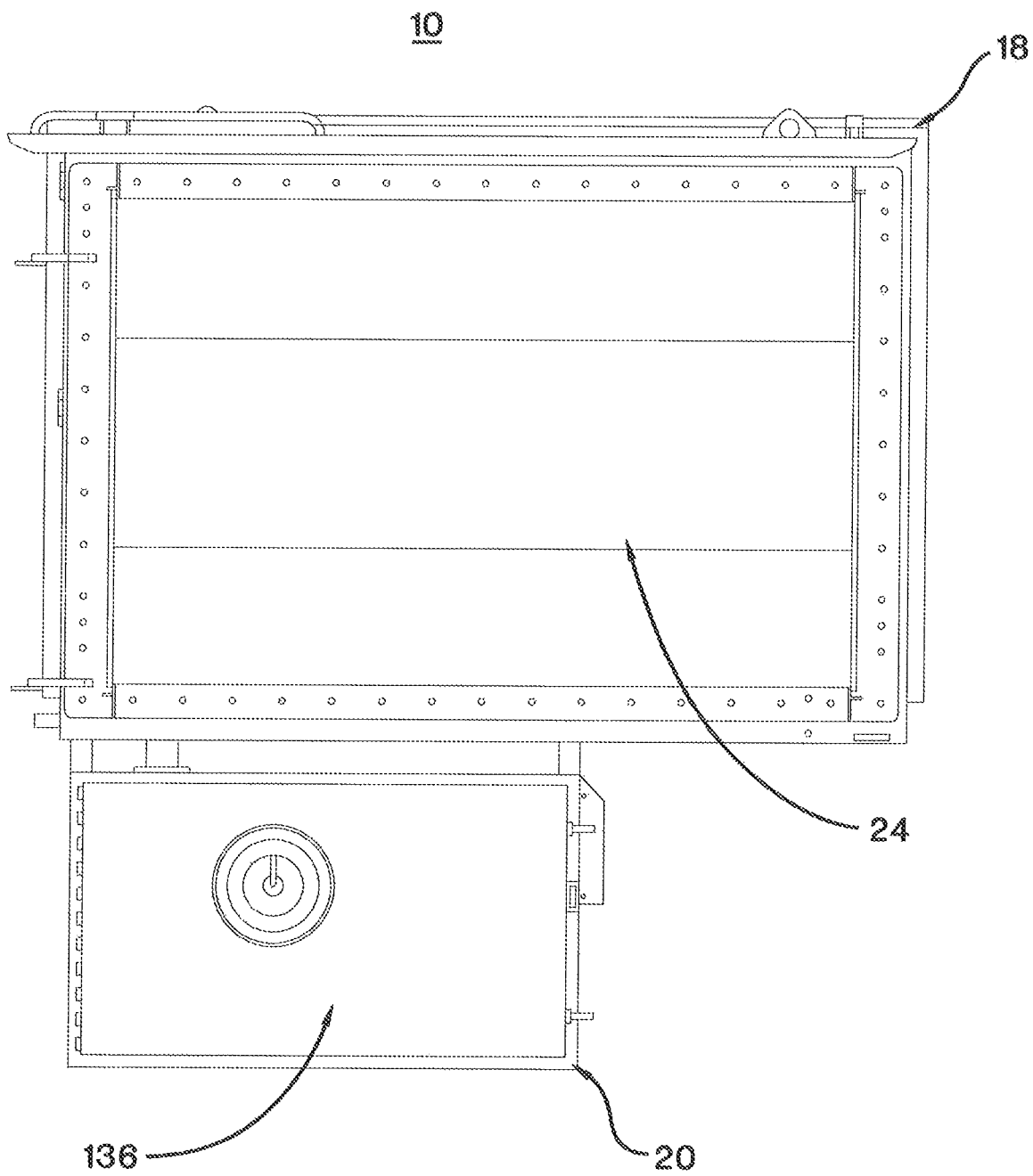
FIG. 1 shows a front elevational view of a tap changer of the present invention.

It should be noted that in the detailed description that follows, identical components have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

Figure 2:
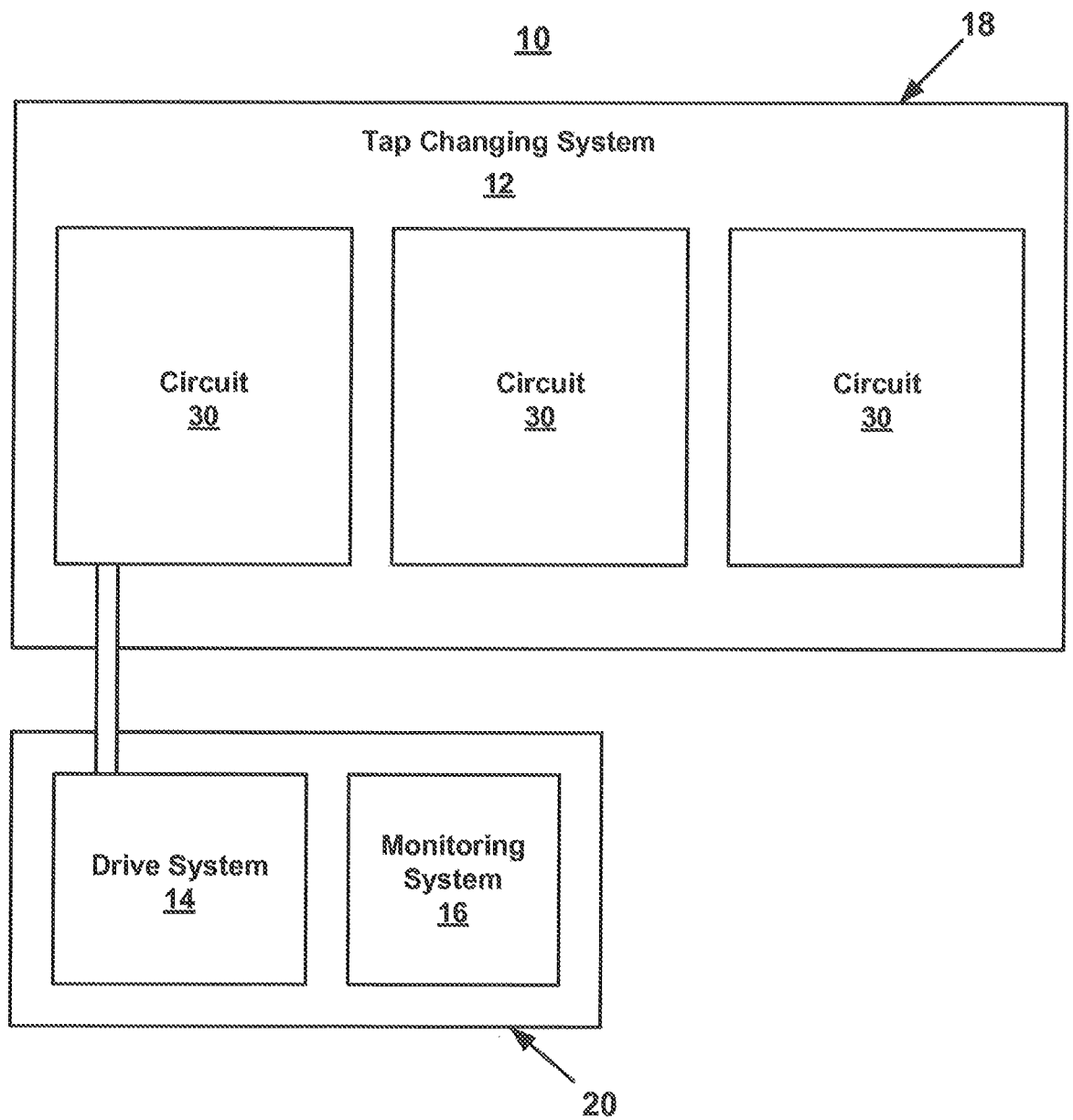
FIG. 2 shows a schematic view of the tap changer.

Referring now to FIGS. 1 and 2, there is shown a load tap changer (LTC) 10 embodied in accordance with the present invention. The LTC 10 is adapted for on-tank mounting to a transformer. Generally, the LTC 10 comprises a tap changing assembly 12, a drive system 14 and a monitoring system 16. The tap changing assembly 12 is enclosed in a tank 18, while the drive system 14 and the monitoring system 16 are enclosed in a housing 20, which may be mounted below the tank 18. The tank 18 defines an inner chamber within which the tap changing assembly 12 is mounted. The inner chamber holds a volume of dielectric fluid sufficient to immerse the tap changing assembly 12. Access to the tap changing assembly 12 is provided through a door 24, which is pivotable between open and closed positions.

Figure 3A:
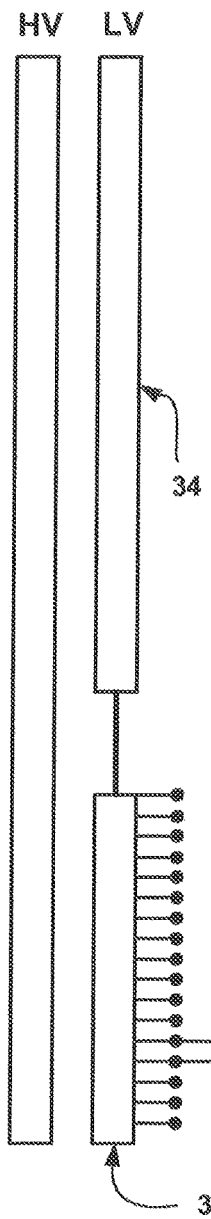
FIG. 3A shows a circuit diagram of the tap changer in a linear configuration.
Figure 3B:
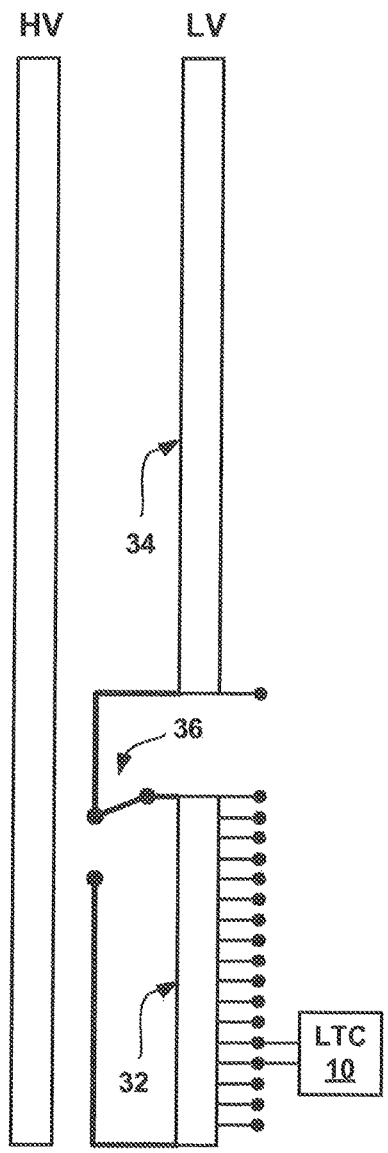
FIG. 3B shows a circuit diagram of the tap changer in a plus-minus configuration.
Figure 3C:
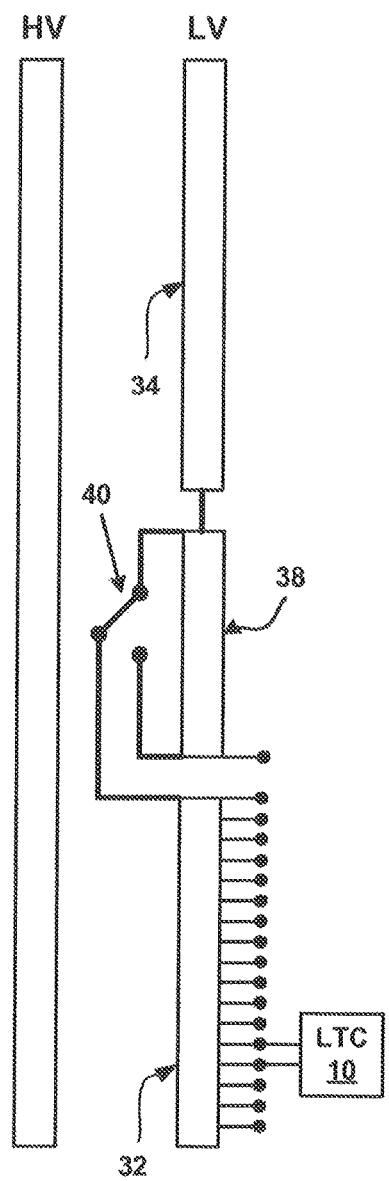
FIG. 3C shows a circuit diagram of the tap changer in a coarse-fine configuration.

The tap changing assembly 12 includes three circuits 30, each of which is operable to change taps on a regulating winding 32 for one phase of the transformer. Each circuit 30 may be utilized in a linear configuration, a plus-minus configuration or a coarse-fine configuration, as shown in FIGS. 3A, 3B, 3C, respectively. In the linear configuration, the voltage across the regulating winding 32 is added to the voltage across a main (low voltage) winding 34. In the plus-minus configuration, the regulating winding 32 is connected to the main winding 34 by a change-over switch 36, which permits the voltage across the regulating winding 32 to be added or subtracted from the voltage across the main winding 34. In the coarse-fine configuration, there is a coarse regulating winding 38 in addition to the (fine) regulating winding 32. A change-over switch 40 connects the (fine) regulating winding 32 to the main winding 34, either directly, or in series, with the coarse regulating winding 38.

Figure 4:
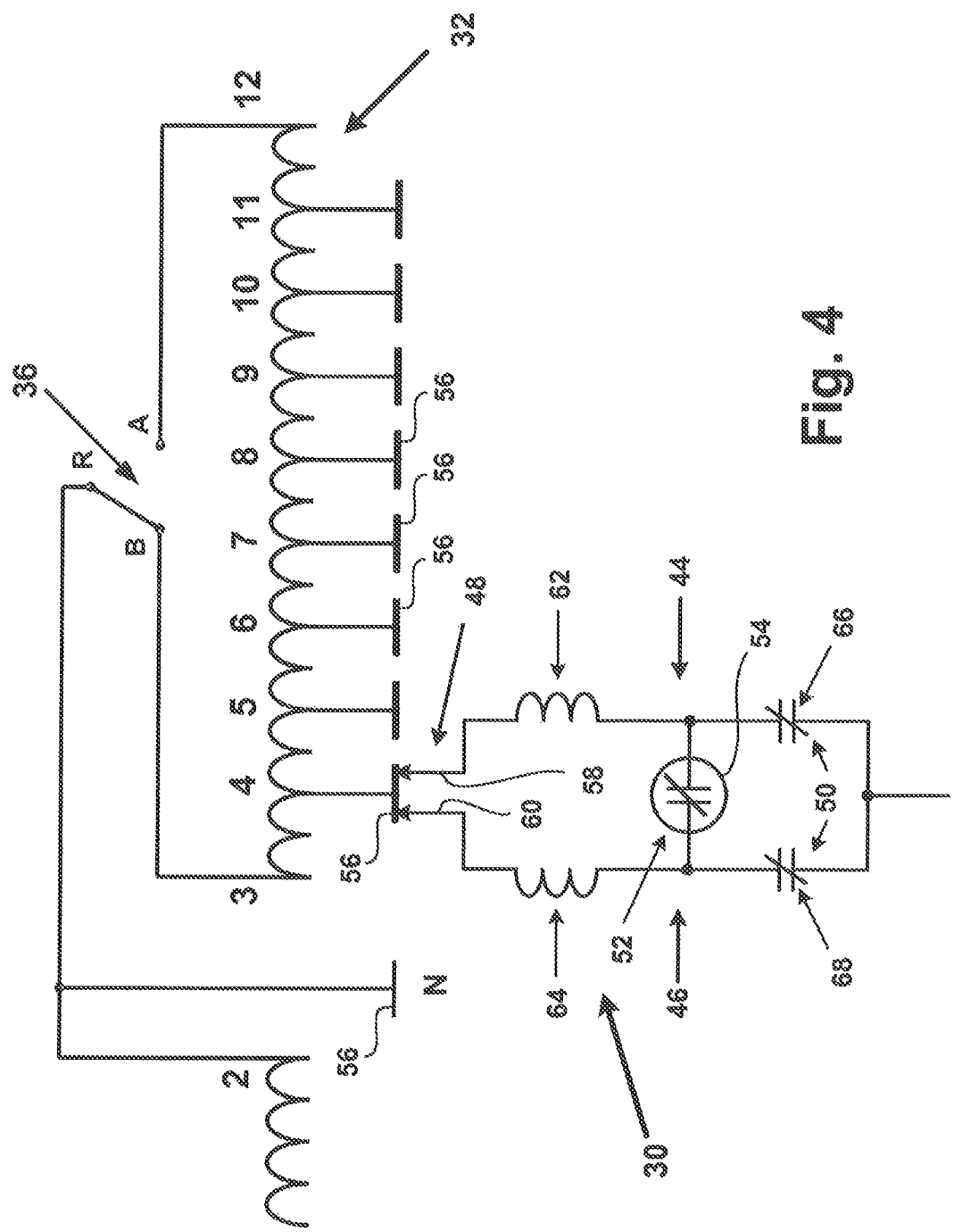
FIG. 4 shows a schematic drawing of an electrical circuit of the tap changer.

Referring now to FIG. 4, there is shown a schematic drawing of one of the electrical circuits 30 of the tap changing assembly 12 connected to the regulating winding 32 in a plus-minus configuration. The electrical circuit 30 is arranged into first and second branch circuits 44, 46 and generally includes a selector switch assembly 48, a bypass switch assembly 50 and a vacuum interrupter assembly 52 comprising a vacuum interrupter 54.

The selector switch assembly 48 comprises movable first and second contact arms 58, 60 and a plurality of stationary contacts 56 which are connected to the taps of the winding 32, respectively. The first and second contact arms 58, 60 are connected to reactors 62, 64, respectively, which reduce the amplitude of the circulating current when the selector switch assembly 48 is bridging two taps. The first contact arm 58 is located in the first branch circuit 44 and the second contact arm 60 is located in the second branch circuit 46. The bypass switch assembly 50 comprises first and second bypass switches 66, 68, with the first bypass switch 66 being located in the first branch circuit 44 and the second bypass switch 68 being located in the second branch circuit 46. Each of the first and second bypass switches 66, 68 is connected between its associated reactor and the main power circuit. The vacuum interrupter 54 is connected between the first and second branch circuits 44, 46 and comprises a fixed contact and a movable contact enclosed in a bottle or housing having a vacuum therein.

The first and second contact arms 58, 60 of the selector switch assembly 48 can be positioned in a non-bridging position or a bridging position. In a non-bridging position, the first and second contact arms 58, 60 are connected to a single one of a plurality of taps on the winding 32 of the transformer. In a bridging position, the first contact arm 58 is connected to one of the taps and the second contact 60 is connected to another, adjacent one of the taps.

In FIG. 4, the first and second contact arms 58, 60 are both connected to tap 4 of the winding 32, i.e., the first and second contact arms 58, 60 are in a non-bridging position. In a steady state condition, the contacts of the vacuum interrupter 54 are closed and the contacts in each of the first and second bypass switches 66, 68 are closed. The load current flows through the first and second contact arms 58, 60 and the first and second bypass switches 66, 68. Substantially no current flows through the vacuum interrupter 54 and there is no circulating current in the reactor circuit.

Figure 5A:
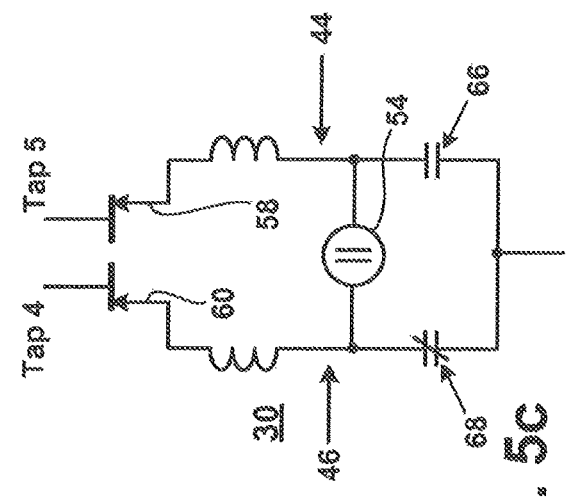
FIG. 5A shows the electrical circuit in a first stage of a tap change in which a first bypass switch is opened.
Figure 5B:
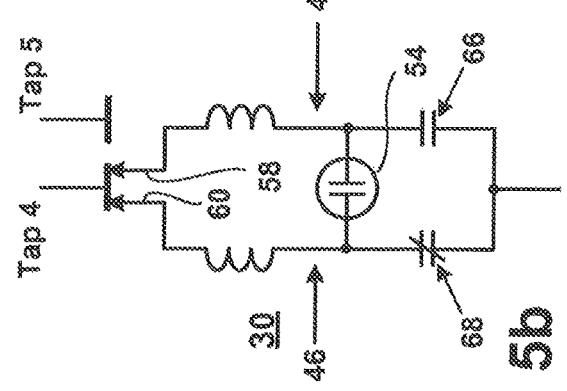
FIG. 5B shows the electrical circuit in a second stage of the tap change in which a vacuum interrupter is opened.
Figure 5C:
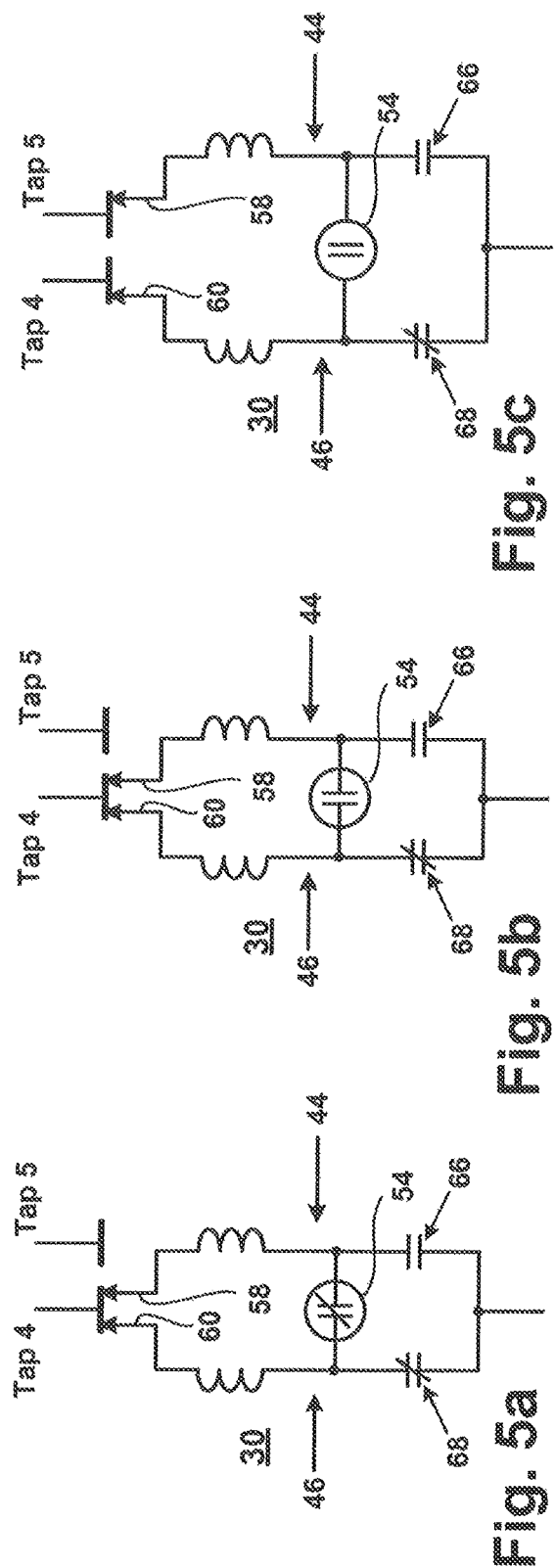
FIG. 5C shows the electrical circuit in a third stage of the tap change in which a first contact arm is moved to a new tap.
Figure 5D:
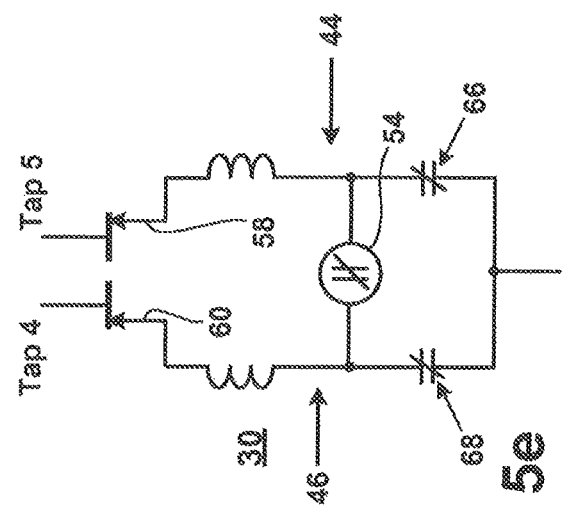
FIG. 5D shows the electrical circuit in a fourth stage of the tap change in which the vacuum interrupter is closed.
Figure 5E:
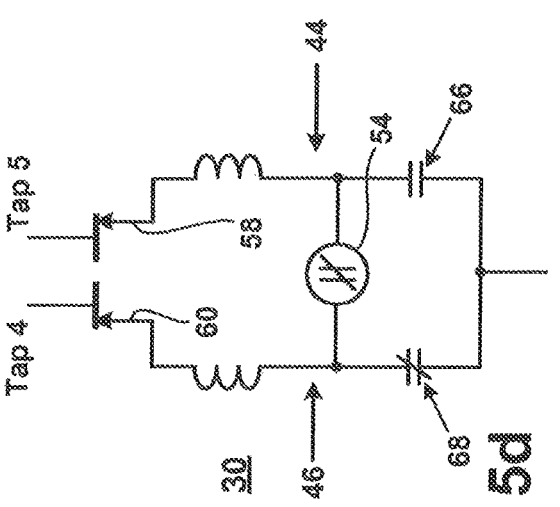
FIG. 5E shows the electrical circuit in a fifth stage of the tap change in which the first bypass switch is closed.

A tap change in which the first and second contact arms 58, 60 are moved to a bridging position will now be described with reference to FIGS. 5A-5E. The first bypass switch 66 is first opened (as shown in FIG. 5A), which causes current to flow through the vacuum interrupter 54 from the first contact arm 58 and the reactor 62. The vacuum interrupter 54 is then opened to isolate the first branch circuit 44 (as shown in FIG. 5B). This allows the first contact arm 58 to next be moved to tap 5 without arcing (as shown in FIG. 5C). After this move, the vacuum interrupter 54 is first closed (as shown in FIG. 5D) and then the first bypass switch 66 is closed (as shown in FIG. 5E). This completes the tap change. At this point, the first contact arm 58 is connected to tap 5 and the second contact arm 60 is connected to tap 4, i.e., the first and second contact arms 58, 60 are in a bridging position. In a steady state condition, the contacts of the vacuum interrupter 54 are closed and the contacts in each of the first and second bypass switches 66, 68 are closed. The reactors 62, 64 are now connected in series and the voltage at their midpoint is one half of the voltage per tap selection. Circulating current now flows in the reactor circuit.

Another tap change may be made to move the second contact arm 60 to tap 5 so that the first and second contact arms 58, 60 are on the same tap (tap 5), i.e., to be in a non-bridging position. To do so, the above-described routine is performed for the second branch circuit 46, i.e, the second bypass switch 68 is first opened, then the vacuum interrupter 54 is opened, the second contact arm 60 is moved to tap 5, the vacuum interrupter 54 is first closed and then the second bypass switch 68 is closed.

In the tap changes described above, current flows continuously during the tap changes, while the first and second contact arms 58, 60 are moved in the absence of current.

As best shown in FIG. 4, the selector switch assembly 48 may have eight stationary contacts 56 connected to eight taps on the winding 32 and one stationary contact 56 connected to a neutral (mid-range) tap of the winding 32. Thus, with the change-over switch 36 on the B terminal (as shown), the selector switch assembly 48 is movable among a neutral position and sixteen discreet raise (plus) positions (i.e., eight non-bridging positions and eight bridging positions). With the change-over switch 36 on the A terminal, the selector switch assembly 48 is movable among a neutral position and sixteen discreet lower (minus) positions (i.e., eight non-bridging positions and eight bridging positions). Accordingly, the selector switch assembly 48 is movable among a total of 33 positions (one neutral position, 16 raise (R) positions and 16 lower (L) positions).

Referring now to FIG. 6, three support structures 80 are mounted inside the tank 18, one for each electrical circuit 30. The support structures 80 are composed of a rigid, dielectric material, such as fiber-reinforced dielectric plastic. For each electrical circuit 30, the bypass switch assembly 50 and the vacuum interrupter assembly 52 are mounted on a first (or front) side of a support structure 80, while the selector switch assembly 48 is mounted behind the support structure 80.

Figure 7:
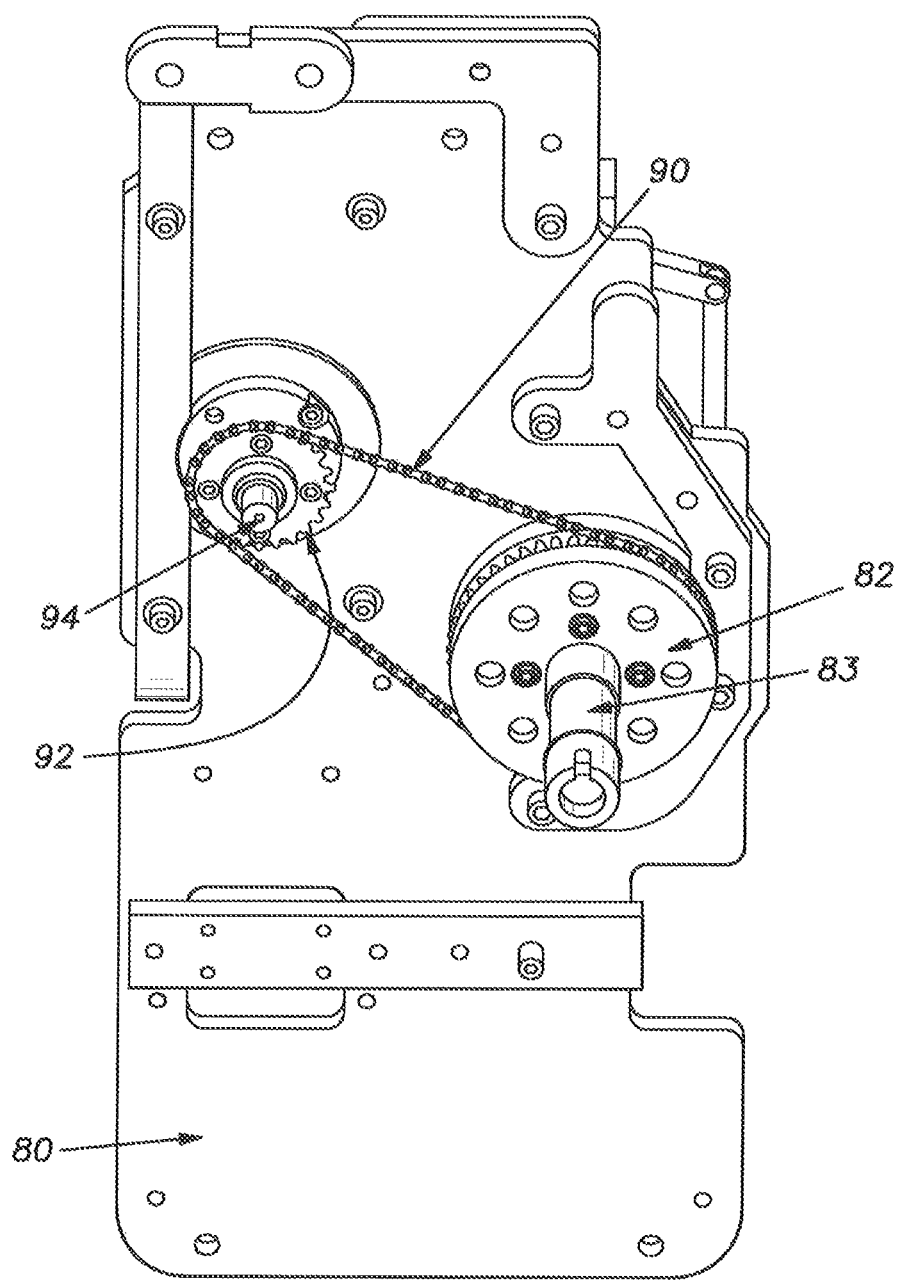
FIG. 7 shows a rear view of a front support structure of the tap changer.

Referring now to FIG. 7, a second side of one of the support structures 80 is shown. A bypass gear 82 and a vacuum interrupter (VI) gear 92 are mounted to the second side. An insulated shaft 83 is shown connected to the bypass gear 82. The shaft 83 is connected by a transmission system 120 (shown in FIG. 8) to a main transmission shaft 122 (shown in FIG. 8) of the drive system 14. The bypass gear 82 is fixed to a bypass shaft that extends through the support structure 80 and into the first side of the support structure 80. The bypass gear 82 is connected by a chain 90 to the VI gear 92, which is secured to a VI shaft 94. The VI shaft 94 also extends through the support structure 80 and into the first side of the support structure 80. When the drive system 14 is activated to effect a tap change, the transmission system 120 and the shaft 83 convey the rotation of the main transmission shaft 122 to the bypass gear 82, thereby causing the bypass gear 82 and the bypass shaft to rotate. The rotation of the bypass gear 82, in turn, is conveyed by the chain 90 to the VI gear 92, which causes the VI gear 92 and the VI shaft 94 to rotate.

Details of the transmission system 120 are disclosed in U.S. provisional patent application No. 61/467,455 filed on Mar. 25, 2011, entitled "Selector Switch Assembly for Load Tap Changer" and in U.S. provisional patent application No. 61/467,822 filed on Mar. 25, 2011, entitled "An Improved Tap Changer", both of which are incorporated herein by reference.

On the first side of the support structure 80, the bypass shaft is secured to a bypass cam, while the VI shaft 94 is secured to a VI cam. The bypass cam rotates with the rotation of the bypass shaft and the VI cam rotates with the rotation of the VI shaft 94. The rotation of the bypass cam actuates the first and second bypass switches 66, 68, while the rotation of the VI cam opens and closes the contacts of the vacuum interrupter 54. The bypass and VI gears 82, 92 are sized and arranged to rotate the bypass cam through 180 degrees for each tap change and to rotate the VI cam through 360° for each tap change.

Figure 8:
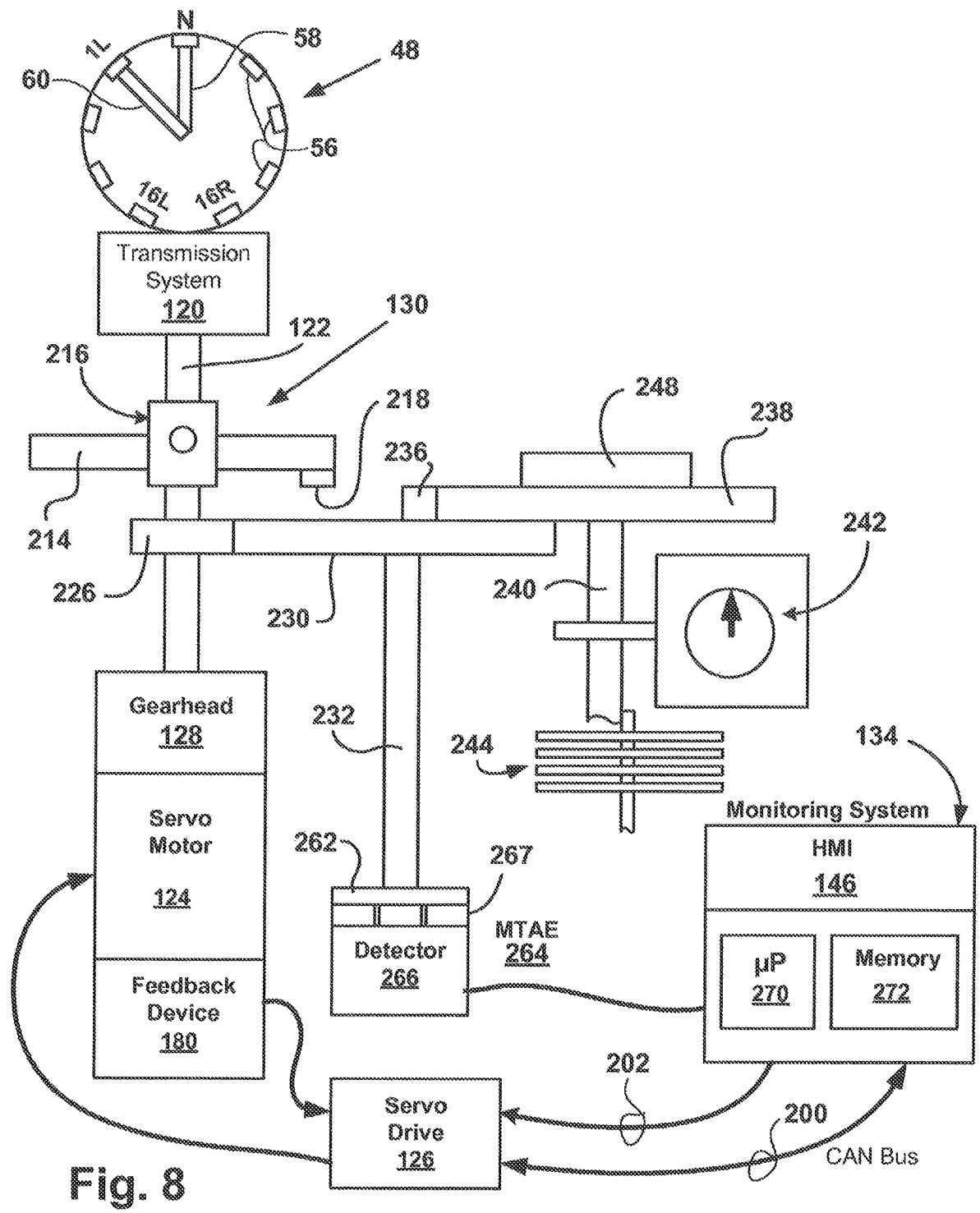
FIG. 8 shows a schematic view of a drive system and a monitoring system of the tap changer.

Referring now to FIG. 8, the transmission system 120 also connects each selector switch assembly 48 to the main transmission shaft 122 of the drive system 14. More specifically, the transmission system 120 translates the rotation of the main transmission shaft 122 into rotational movement of the first and second contact arms 58, 60. This rotational movement is indexed and is around a common axis in the center of a circular configuration of the stationary contacts 56. The first and second contact arms 58, 60 are aligned, with the second contact arm 60 disposed over the first contact arm 58 when they are connected to the same stationary contact 56 (in a non-bridging position). The stationary contacts 56 are arranged in a circle, with the neutral stationary contact N being located at the top and a maximum lower contact 16L and a maximum raise contact 16R being located toward the bottom. The stationary contact 56 adjacent to the neutral contact N in the counter clockwise (CCW) direction is hereinafter referred to as the 1L contact. Rotation of the first contact arm 58 between the neutral contact N and the 1L contact actuates the changeover switch 36. More specifically, the CCW rotation of the first contact arm 58 from the neutral contact N to the 1L contact moves the change-over switch 36 to the A terminal, while clockwise (CW) rotation of the first contact arm 58 from the 1L contact to the neutral contact N moves the change-over switch 36 to the B terminal. In the embodiment described above where there are 16R positions, 16L positions and a neutral position (the neutral stationary contact N), once the first and second contact arms 58, 60 have been moved CCW and are in the 16L position (both on the 16L contact), the first and second contact arms 58, 60 must be moved back CW to the neutral position before the first and second contact arms 58, 60 can be moved to any of the 1-16R positions. Similarly, once the first and second contact arms 58, 60 have been moved CW and are in the 16R position (both on the 16R contact), the first and second contact arms 58, 60 must be moved back CCW to the neutral position before the first and second contact arms 58, 60 can be moved to any of the 1-16L positions. Moving the first and second contact arms 58, 60 of each circuit 30 among the neutral, the 1L-16L and the 1R-16R positions (and the associated operation of each bypass switch assembly 50 and each vacuum interrupter assembly 52) may be referred to as moving the tap changing assembly 12 among the taps.

Figure 9:
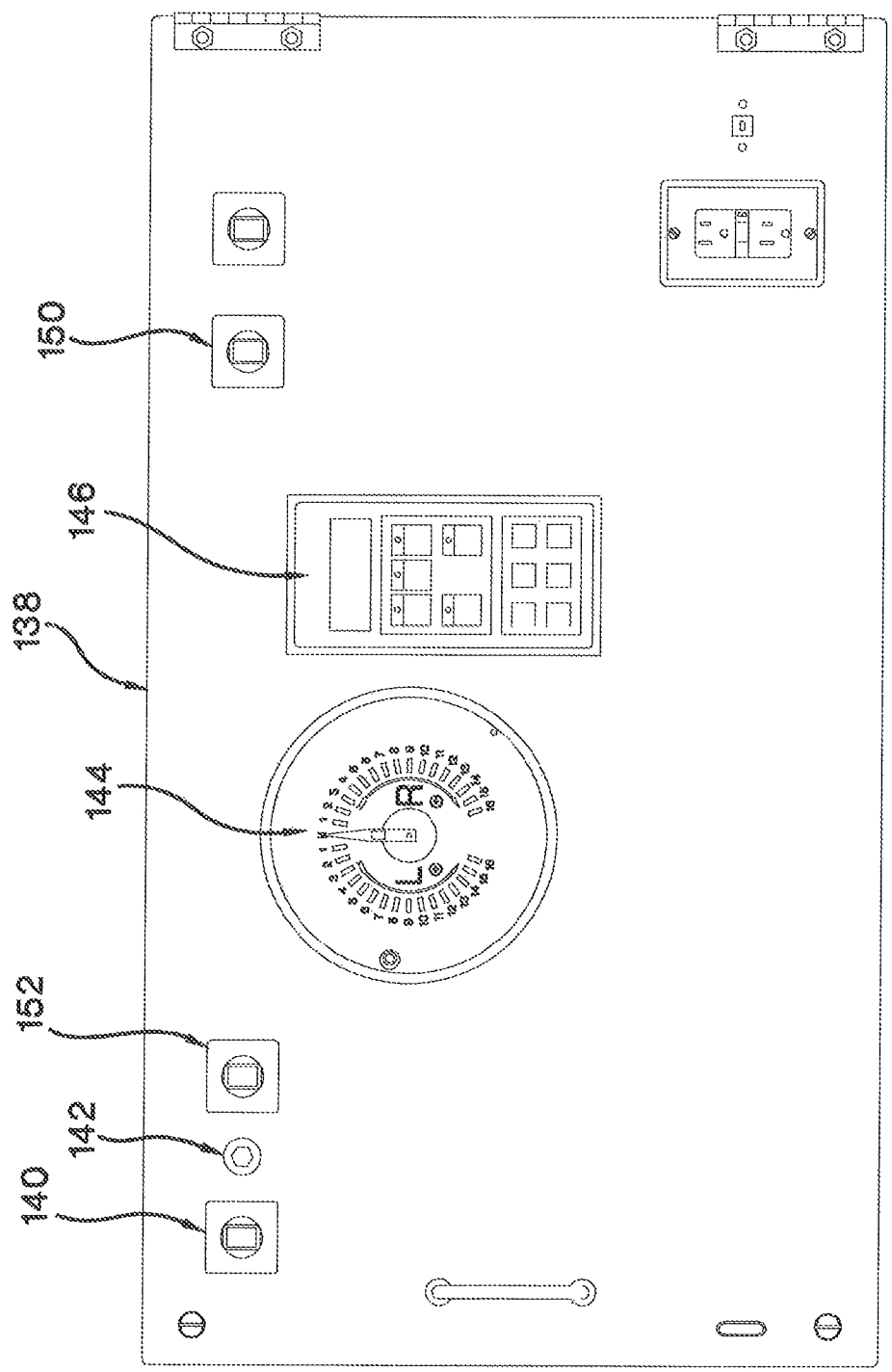
FIG. 9 shows a front view of a swing panel of a housing for the drive system.
Figure 10:
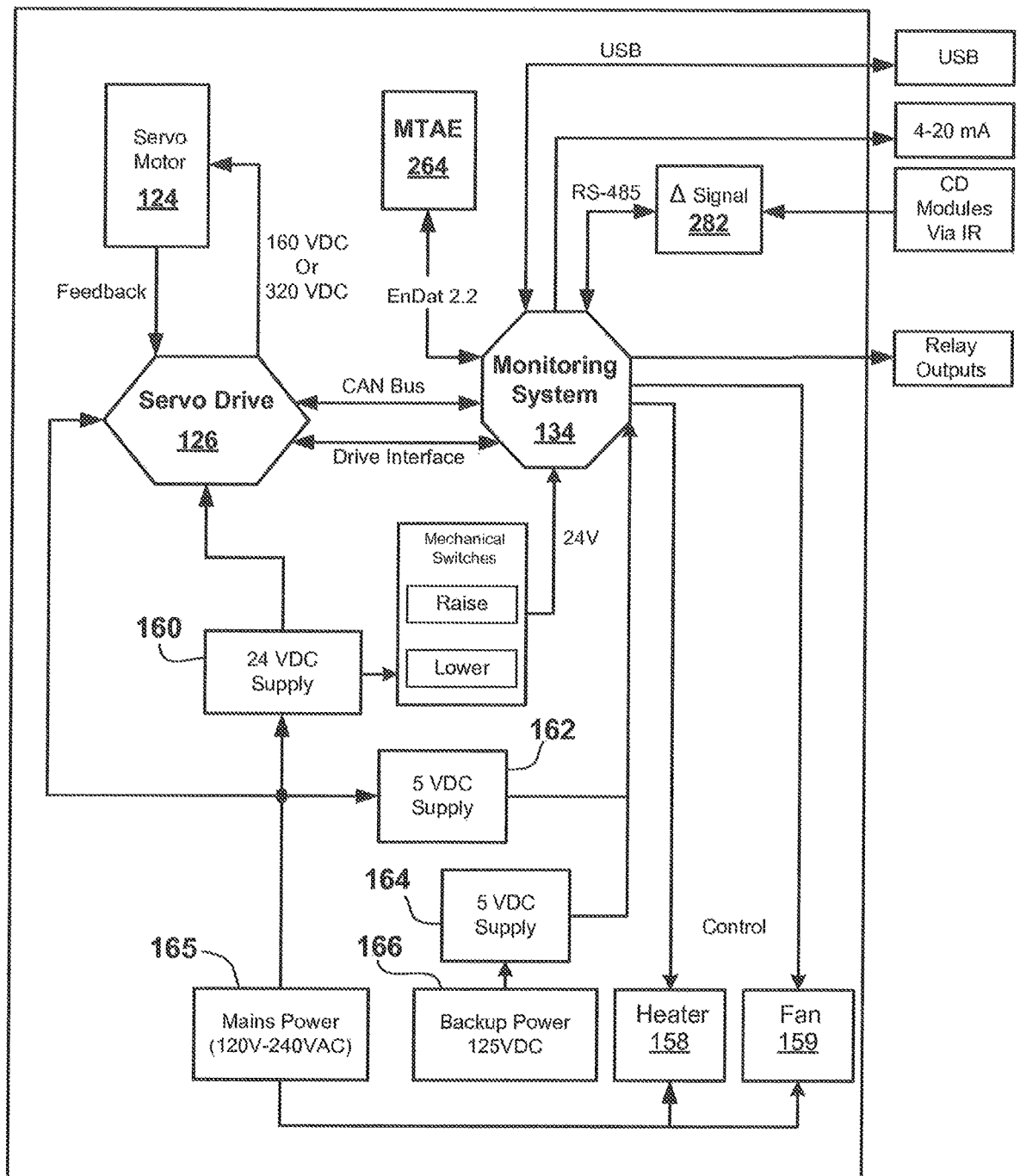
FIG. 10 shows a schematic view of the power and communication connections among the components of the drive system and the monitoring system.

Referring now also to FIGS. 9 and 10, the drive system 14 generally includes a servo motor 124, a servo drive 126, a gear head 128 and a hand crank assembly 130. The drive system 14 interfaces with and is controlled by the monitoring system 134. As set forth above, the drive system 14 and the monitoring system 134 are mounted inside the housing 20, which has a front opening through which the drive system 14 and the monitoring system 134 may be accessed. As shown in FIG. 1, an outer door 136 is pivotally mounted to the housing 20 and is operable to close the front opening. With particular reference now to FIG. 9, a swing plate 138 is pivotally mounted to the housing 20, inwardly of the outer door 136. The swing plate 138 has a plurality of openings through which interface devices inside the housing 20 are accessible when the swing plate 138 is in a closed position. For example, a mode switch 140, a socket 142, a mechanical tap position indicator 144 and a human machine interface (HMI) 146 all extend through and/or are accessible through openings in the swing plate 138 when the swing plate 138 is closed. In addition to providing access to the foregoing interface devices, the swing plate 138 has a number of interface devices directly mounted thereto. For example, a return-to-neutral switch 150 and a lower/raise switch 152 are mounted directly to the swing plate 138. The swing plate 138 functions as a second door that protects the equipment inside the housing 20, while providing access to interface devices.

With particular reference to FIG. 10, one or more heaters 158, one or more fans 159, one or more temperature sensors and one or more humidity sensors are installed inside the housing 20. These devices are electrically connected to and controlled by the monitoring system 134 so as to maintain an environment suitable for the servo drive 126, the monitoring system 134 and the other devices inside the housing 20.

Also mounted inside the housing 20 are a 24 VDC power supply 160, a first 5 VDC power supply 162 and a redundant, second 5 VDC power supply 164. The servo drive 126, the heater 158, the fan 159, the 24 VDC power supply 160 and the first 5 VDC power supply 162 are provided with 120 VAC to 240 VAC power from a mains power supply 165. The second 5 VDC power supply 164 may be connected to a backup power supply 166. The monitoring system 134 is provided with power from the first 5 VDC power supply 162 or, in the event of a failure of the mains power supply 165, the second 5 VDC power supply 164.

Figure 11:
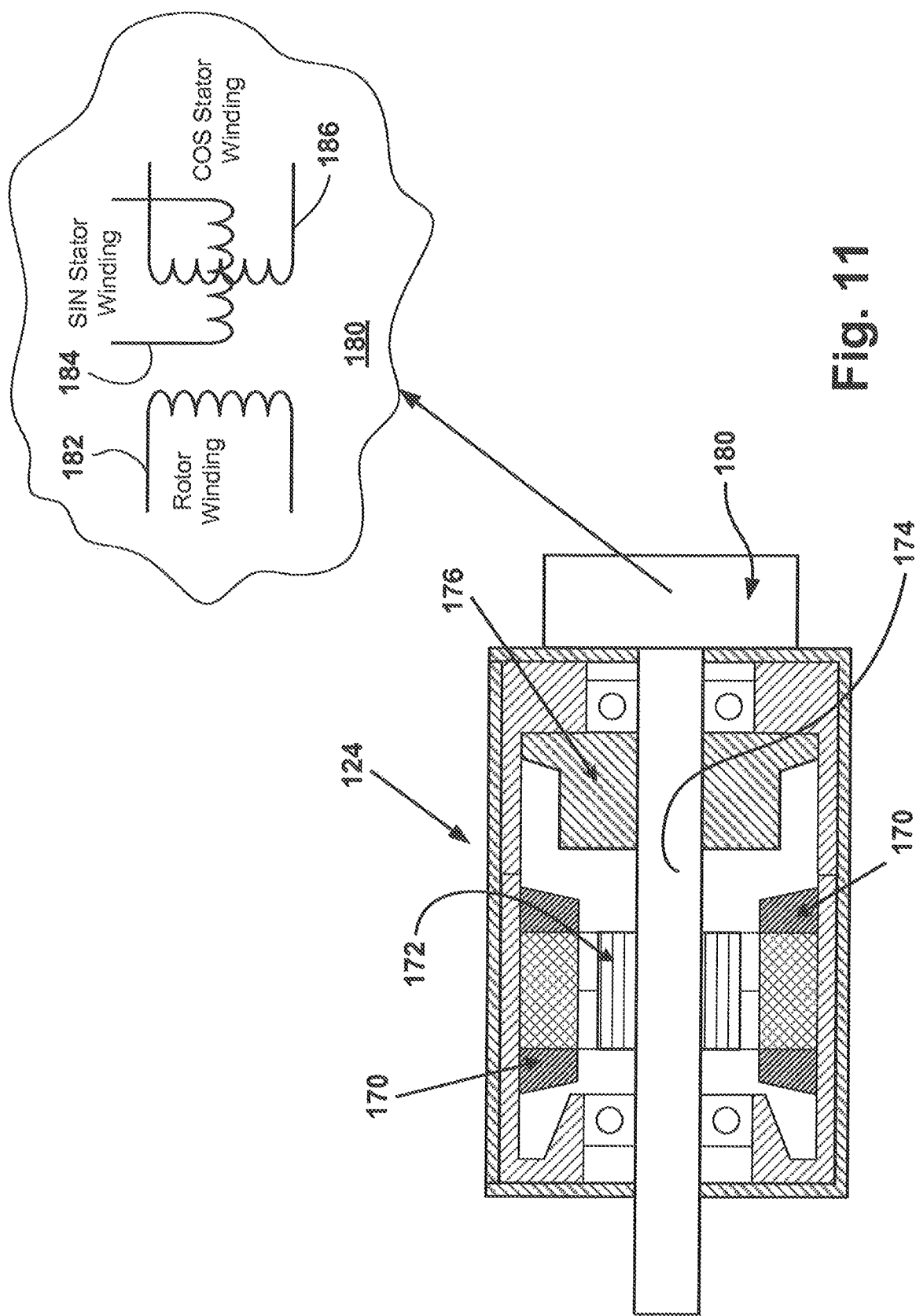
FIG. 11 shows a schematic sectional view of a servo motor of the drive system.

Referring now to FIG. 11, there is shown a sectional view of an embodiment of the servo motor 124. In this embodiment, the servo motor 124 is a brushless AC induction motor having a fixed stator 170 and a rotating rotor 172 secured to a shaft 174. When voltage is applied to the stator 170, current flows in the stator 170 and induces current to flow in the rotor 172 through magnetic induction. The interaction of the magnetic fields in the stator 170 and the rotor 172 causes the rotor 172 and, thus, the shaft 174 to rotate. The stator 170 is located radially outward from the rotor 172 and may be comprised of laminations and turns of an electrical conductor. The rotor 172 may have a "squirrel cage" construction comprised of stacks of steel laminations separated by slots filled with conductive material, such as copper or aluminum.

The servo motor 124 may include a brake 176 that holds the position of the shaft 174 when power to the servo drive 126 and, thus, the servo motor 124 is cut off. The brake 176 may be a spring-type brake or a permanent magnet-type brake.

The servo motor 124 is provided with feedback device 180, which may be a resolver or a multi-turn absolute encoder. Resolvers are described in the immediately following paragraphs, while a multi-turn absolute encoder is described further below.

In one embodiment, the feedback device 180 is a single speed resolver transmitter, as is shown in FIG. 11. The resolver transmitter is essentially a rotary transformer having a rotor winding 182 rotatably disposed inside a stationary pair of SIN and COS stator windings 184, 186, which are positioned 90 degrees apart. The rotor winding 182 is connected in some manner to the motor shaft 174 so as to rotate therewith. The rotor winding 182 is excited by an AC voltage called the reference voltage (Vr). The induced voltages in the SIN and COS stator windings 184, 186 are equal to the value of the reference voltage multiplied by the SIN or COS of the angle of the motor shaft 174 from a fixed zero point. Thus, the resolver transmitter provides two voltages whose ratio represents the absolute position of the shaft. (SIN θ/COS θ=TAN θ, where θ=shaft angle.) The induced voltages in the SIN and COS stator windings 184, 186 are provided to a microcontroller of the resolver, which analyzes the signals and generates a feedback signal that contains information about the speed and angular position of the motor shaft 174. The microcontroller then outputs the feedback signal to the servo drive 126. In one embodiment of the invention, the feedback signal comprises a series of pulses or counts, wherein, for example, 16,384 counts are generated per each 360° rotation of the motor shaft 174. Thus, a count is generated for about each 0.02 degree movement of the motor shaft 174. The counts are positive when the servo motor 124 is running in a first direction, such as to make a tap change from 1R to 2R and are negative when the servo motor 124 is running in a second direction, such as to make a tap change from 1L to 2L. When viewed from a top, front perspective, such as in FIG. 13, the first direction is CW and the second direction is CCW.

The resolver transmitter described above is considered a single speed resolver transmitter because the output signals go through only one sine wave (and one cosine wave) as the motor shaft 174 rotates through 360°.

It should be appreciated that in lieu of being a single speed resolver transmitter, the feedback device 180 may be a multiple speed resolver transmitter, such as a 4-speed resolver transmitter in which the output signals go through four sine waves as the motor shaft 174 rotates through 360°. Further, the feedback device 180 may be a resolver control transformer, which has two stator windings and two rotor windings. The two rotor windings are provided with excitation signals and position information is derived from signals from the stator windings. Further still, the feedback device 180 may be a synchro, which is similar to a resolver transmitter, except there are three stator windings, separated by 120°. A resolver transmitter (single or multiple speed) and a resolver control transformer are generically referred to as a "resolver".

Figure 12:
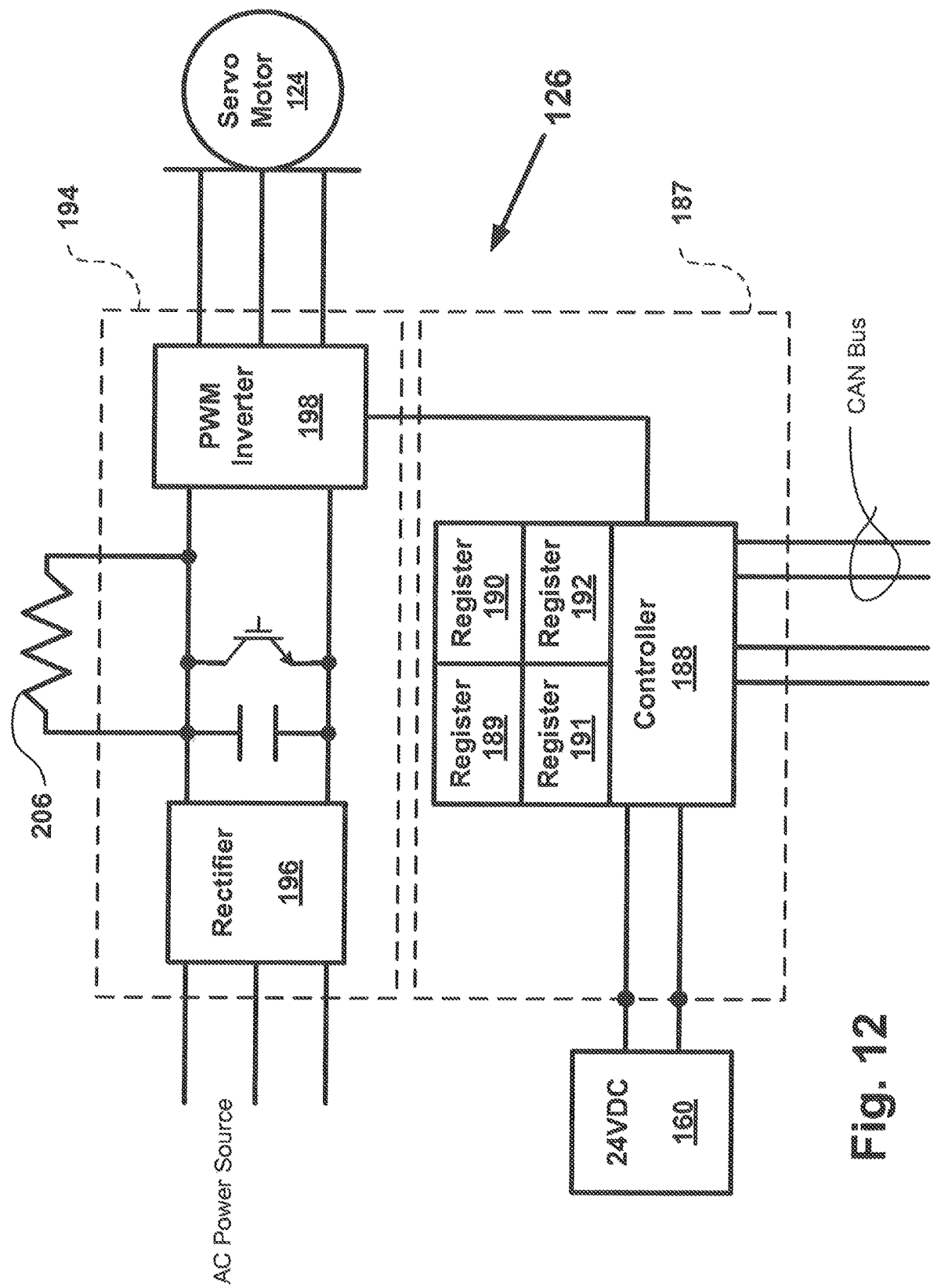
FIG. 12 shows a schematic view of a servo drive of the drive system.

Referring now to FIG. 12, the servo drive 126 controls the operation of the servo motor 124 by controlling the power provided to the servo motor 124. The servo drive 126 generally includes a low voltage section 187 and a high voltage section 194. The low voltage section 187 includes a controller 188 and a plurality of associated registers, including a speed register 189, a plus stop register 190, a minus stop register 191 and a feedback register 192. The controller 188 is microprocessor-based and receives command signals from the monitoring system 134 or local devices, such as the lower/raise switch 152. In addition, the controller 188 receives the feedback signal from the feedback device 180 and derives feedback information therefrom (e.g., angular position, speed). The controller 188 compares a command and feedback information to generate an error that the controller 188 then acts on to eliminate. The controller 188 acts on the error using an algorithm, such as a proportional and integral (PI) algorithm, or a proportional, integral and derivative (PID) algorithm. The output of the algorithm is a low power level control signal, which is provided to the high voltage section 194. Using power from the mains power supply 165, the high voltage section 194 amplifies the low power level control signal to a higher power level that is then provided to the servo motor 124. The high voltage section 194 may convert the AC power to DC power in a rectifier 196 and generate an output to the servo motor 124 using a pulse width modulation inverter 198. It is generally noted that higher voltage levels are needed to rotate the servo motor 124 at appropriate higher speeds and higher current levels are required to provide torque to move heavier loads.

As set forth above, there is a plurality of registers associated with the controller 188. These registers store information that is used by the controller 188 to control the operation of the servo motor 124. The speed register 189 stores the speed at which the servo motor 124 is to operate when making a tap change. The plus stop register 190 stores the number of positive feedback units (e.g. counts) from the feedback device 180 that corresponds to a stop location in the first direction of rotation of the motor shaft 174. Similarly, the minus stop register 191 stores the total number of negative feedback units (e.g. counts) from the feedback device 180 that corresponds to a stop location in the second direction of rotation of the motor shaft 174. The feedback register 192 stores motor shaft 174 position information obtained from the feedback signal. In the embodiment described above where the feedback signal comprises a series of counts, the feedback register 192 stores a running total of the received counts. Since the motor shaft 174 rotates twenty times for each tap change and 16,384 counts are generated for each rotation, the register will store 327,680 counts for each tap change. If power to the servo drive 126 is cut-off, all of the stored information in the speed register 189, the plus stop register 190, the minus stop register 191 and the feedback register 192 is lost and, upon restoration of power, the values in the registers are set to zero.

The number of feedback units stored in the plus stop register 190 are used by the controller 188 to automatically stop the rotation of the shaft 174 of the servo motor 124 in the first direction after it has moved the tap changing assembly 12 to tap position 16R or slightly beyond. In the embodiment described above where the feedback signal comprises a series of counts, the number of counts stored in the plus stop register 190 may be +5,242,880 counts or slightly more. The number of feedback units stored in the minus stop register 191 are used by the controller 188 to automatically stop the rotation of the shaft 174 of the servo motor 124 in the second direction after it has moved the tap changing assembly 12 to tap position 16L or slightly beyond. In the embodiment described above where the feedback signal comprises a series of counts, the number of counts stored in the minus stop register 190 may be −5,242,880 counts or slightly more (negative counts). From the foregoing, it should be appreciated that the controller 188, using the feedback units (e.g. counts) stored in the plus stop register 190 and the minus stop register 191, performs an "electronic hard stop" that prevents the tap changing assembly 12 from going from the 16R position through neutral and then to the 1R position, and prevents the tap changing assembly 12 from going from the 16L position through neutral and then to the 1L position.

The operation of the servo drive 126 is controlled by signals received by the controller 188 from the monitoring system 134. Two of these signals are: hardware (H/W) enable and normal mode software (NMS) enable. When the H/W enable signal is received, the controller 188 only permits control algorithms in the monitoring system 134 to control the tap changing assembly 12. When the NMS enable signal is received, the controller 188 further permits the servo drive 126 to be controlled by command signals from local devices (e.g. the lower/raise switch 152), the HMI 146 and remote devices. If neither the H/W enable signal nor the NMS enable signal are received, the servo drive 126 is "locked-out". The servo drive 126 can only be moved out of the locked-out state by the actuation of a clear button on the HMI 146 by an operator after the problem causing the locked-out state has been corrected. There is bi-directional communication between the servo drive 126 and the monitoring system 134 over a CAN bus 200. In addition, the monitoring system 134 sends digital command signals to the servo drive 126 over a drive interface 202 (shown in FIG. 8). Digital signals may also be sent from the servo drive 126 to the monitoring system 134 over the drive interface 202.

A dynamic braking resistor 206 (shown in FIG. 12) may be provided to quickly stop the rotation of the motor shaft 174. When switched on, the dynamic braking resistor 206 dissipates energy from the servo motor 124. The dynamic braking resistor 206 may be internal or external to the servo drive 126 and may be switched on by a transistor. The dynamic braking resistor 206 is operable to stop the rotation of the motor shaft 174 with less than half a revolution) (<180° of further rotation of the motor shaft 174. In this regard, it should be noted that the controller 188 of the servo drive 126 uses acceleration and deceleration values stored in non-volatile memory (e.g., EEPROM) of the servo drive 126 to control the rate at which the motor shaft 174 is started and stopped, respectively. These values can be changed by authorized maintenance personnel when the tap changer 10 is shut down for maintenance.

Referring back to FIG. 8, the servo motor 124 is connected to the gearhead 128, which is operable to multiply the torque of the servo motor 124 and increase its torsional stiffness. This permits the servo motor 124 to be reduced in size and operate over its optimum range. In addition, the gearhead 128 minimizes reflected inertia for maximum acceleration. The gearhead 128 includes an output shaft and planetary gears and is attached to the shaft of the servo motor 124 by self-locating input pinion clamps. In one embodiment, the gearhead 128 is operable to produce one rotation of its output shaft for each 10 ten revolutions of the motor shaft 174.

Figure 13:
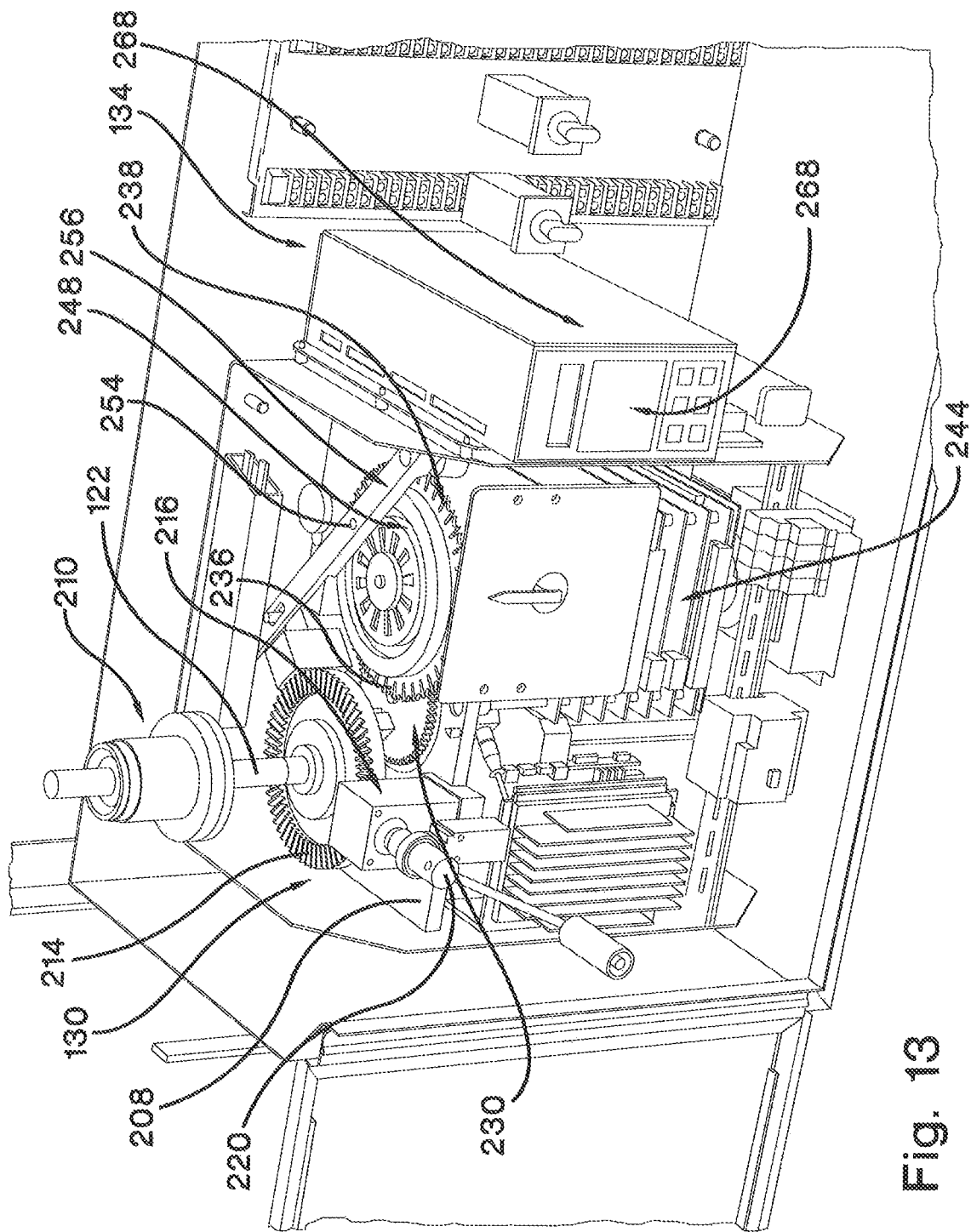
FIG. 13 shows a perspective view of the interior of the housing containing the drive system and the monitoring system.

Referring now also to FIG. 13, the output shaft of the gear head 128 is connected to the main transmission shaft 122, which extends upward through an opening in a shelf 208 secured between two interior side walls. Above the shelf 208, the main transmissions shaft 122 extends upward through an opening in the housing 20 and into the tank 18. The main transmission shaft 122 enters the tank 18 through a feedthrough assembly 210 secured within an opening in a bottom wall of the tank 18. The feed through assembly 210 includes a gasket for sealing the opening in the tank 18. Inside the tank 18, the main transmission shaft 122 is connected to the selector switch assemblies 48, the bypass switch assemblies 50 and the vacuum interrupter assemblies 52 via the transmission system 120. Rotation of the main transmission shaft 122 effects a tap change, as described above. More specifically, a 720° rotation of the main transmission shaft 122 results in one complete tap change. Since ten revolutions of the motor shaft 174 produces one rotation of the main transmission shaft 122, the servo motor 124 rotates 20 times for each tap change. The tight control provided by the drive system 14 permits the rotation of the main transmission shaft 122 to be stopped at the end of a tap change with less than 15° of further rotation of the main transmission shaft 122.

Figure 14:
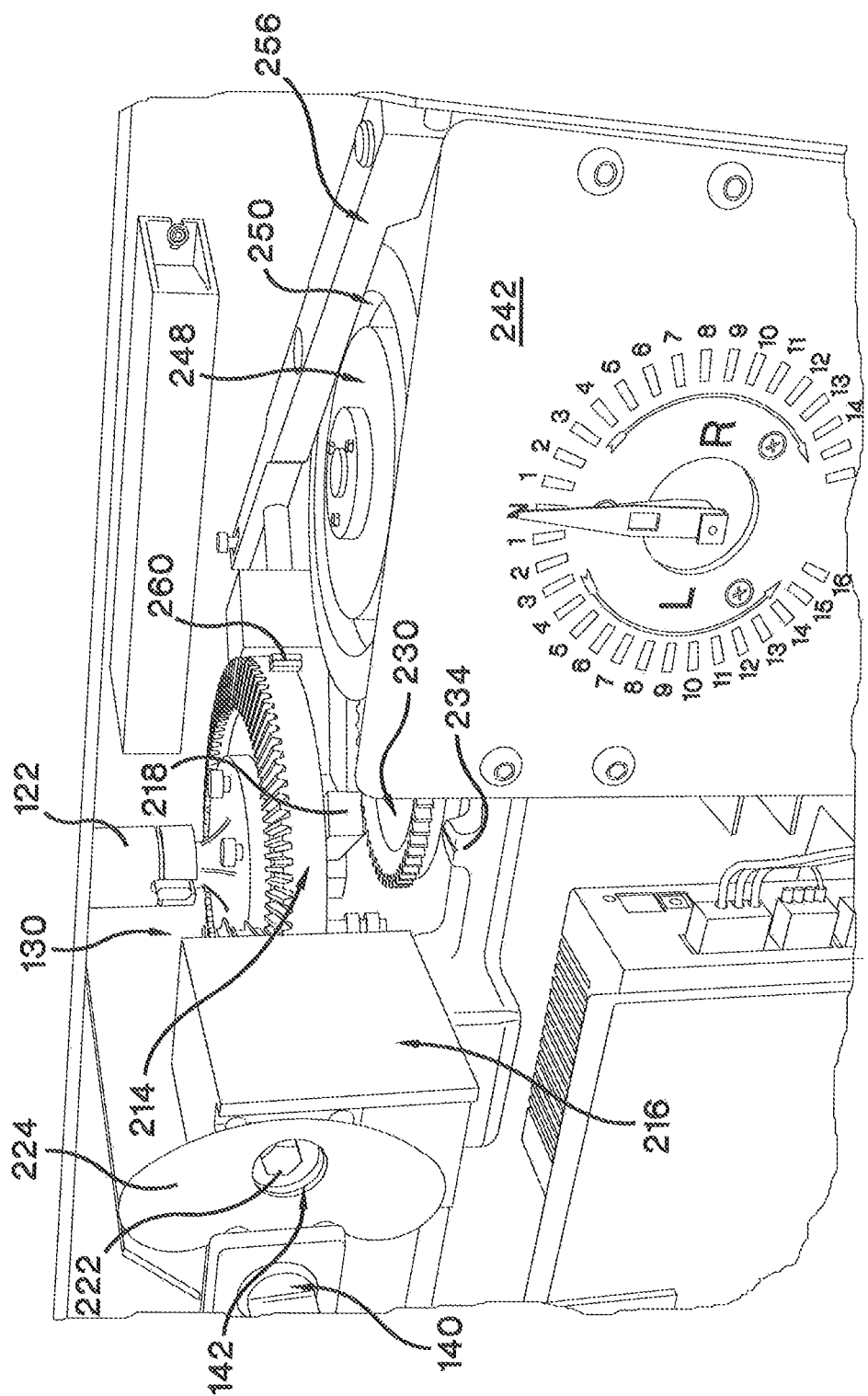
FIG. 14 shows a close-up view of a hand crank assembly and other components of the drive system.
Figure 15:
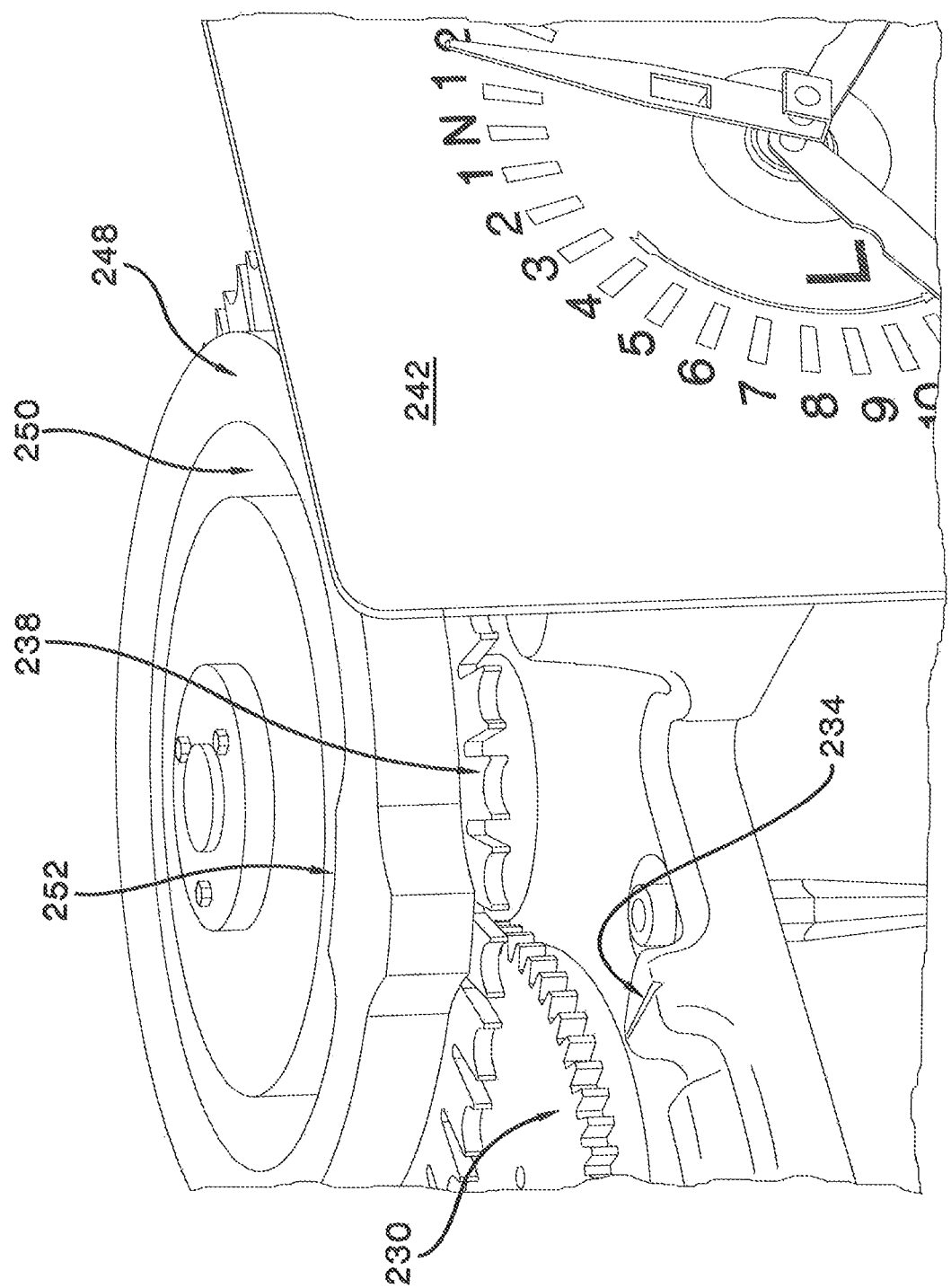
FIG. 15 shows a close-up view of a cam and Geneva gear of the drive system.

Referring now also to FIGS. 14 and 15, the hand crank assembly 130 includes an enlarged hand crank gear 214 and a cranking device 216. The hand crank gear 214 is secured to the main transmission shaft 122, above the shelf 208. A block 218 is secured to an underside of the hand crank gear 214. The cranking device 216 is mounted to the shelf 208, proximate to the hand crank gear 214. The cranking device 216 includes a gear that engages the hand crank gear 214 and an internal mechanism that translates rotation of a handle 220 (shown in FIG. 13) into rotation of the gear and, thus, the hand crank gear 214 and the main transmission shaft 122. The handle 220 is typically stowed away and is only used when manual movement of the main transmissions shaft 122 is required. The handle 220 has an end with a cavity adapted to securely receive a contoured shaft 222 of the internal mechanism. The shaft 222 is disposed inside the socket 142 in the housing of the cranking device 216. The shaft 222 may have a hexagonal cross-section, as shown. When the end of the handle 220 is inserted into the socket 142 and engaged with the shaft 222, the handle 220 may be manually rotated to rotate the main transmission shaft 122, such as for making a full or partial manual tap change.

The mode switch 140 is mounted adjacent to the cranking device 216. (It should be noted that although the mode switch 140 is not shown in FIG. 13, it should be considered present.) The mode switch 140 is connected to the servo drive 126 and the monitoring system 134 and includes four positions: hand crank, off, local and remote. In the local mode, the mode switch 140 interlocks signals from local control devices (such as the lower/raise switch 152) to control the servo drive 126 and, thus, the servo motor 124. In the remote mode, the mode switch 140 interlocks signals from remote locations to control the servo drive 126 and, thus, the servo motor 124. In the hand crank mode, the mode switch 140 disconnects power to the servo drive 126 and signals the monitoring system 134 to negate the H/W enable signal to the servo drive 126, thereby rendering the servo motor 124 inoperative. The mode switch 140 has a rotatable handle for moving between the four positions. An irregular-shaped plate 224 with an enlarged opening is connected to the handle 223 so as to rotate therewith. The plate 224 is rotatable between a non-blocking position, wherein the opening is aligned with the socket 142 in the housing, and a blocking position, wherein the plate 224 blocks the socket 142 in the housing. The plate 224 is in the non-blocking position only when the handle 223 is in a position that places the mode switch 140 in the hand crank mode. Thus, the handle 220 can only be inserted into the socket 142 and into engagement with the shaft 222 when the mode switch 140 is in the hand crank mode. In this manner, the cranking device 216 can only be used to manually move the main transmission shaft 122 when power is cut-off to the servo motor 124.

Below the hand crank gear 214, a first gear 226 (schematically shown in FIG. 8) is secured to the main transmission shaft 122. The first gear 226 is drivingly engaged with an enlarged second gear 230 that is secured to a first side shaft 232. The first and second gears 226, 230 are sized such that two rotations of the main transmission shaft 122 cause the first side shaft 232 to make one rotation, i.e., there is a two-to-one reduction. In this manner, the first side shaft 232 will rotate 360° for each tap change. Position markings are provided on a top surface of the second gear 230. These markings, in relation to a reference point 234, provide a visual indication of where in a tap change the tap changing assembly 12 is located. The markings and reference point 234 are visible to an operator who is manually moving the main transmission shaft 122 using the cranking device 216, thereby helping the operator to properly move the tap changing assembly 12 to a desired position.

A pinion 236 (shown schematically in FIG. 8) is secured to the second gear 230 and extends upwardly therefrom. The pinion 236 is located toward the center of the second gear 230 and drivingly engages teeth of a Geneva gear 238, which is sized and constructed to rotate 10 degrees for each full rotation of the second gear 230, i.e., for each tap change. The Geneva gear 238 is secured to a second side shaft 240 that is drivingly connected to a mechanical tap position indicator 242, which shows the tap changer positions N, 1-16L and 1-16R arranged in a circular configuration, similar to the face of a clock. The second side shaft 240 is also connected to an extension shaft that extends through a plurality of circuit boards 244. Conductive wiper arms are secured to the extension shaft and engage contacts mounted to the circuit boards 244 during the rotation of the extension shaft, thereby generating signals representative of the position of the main transmission shaft 122 (and the current tap position of the tap changing assembly 12). These signals are provided to external devices.

Figure 16:
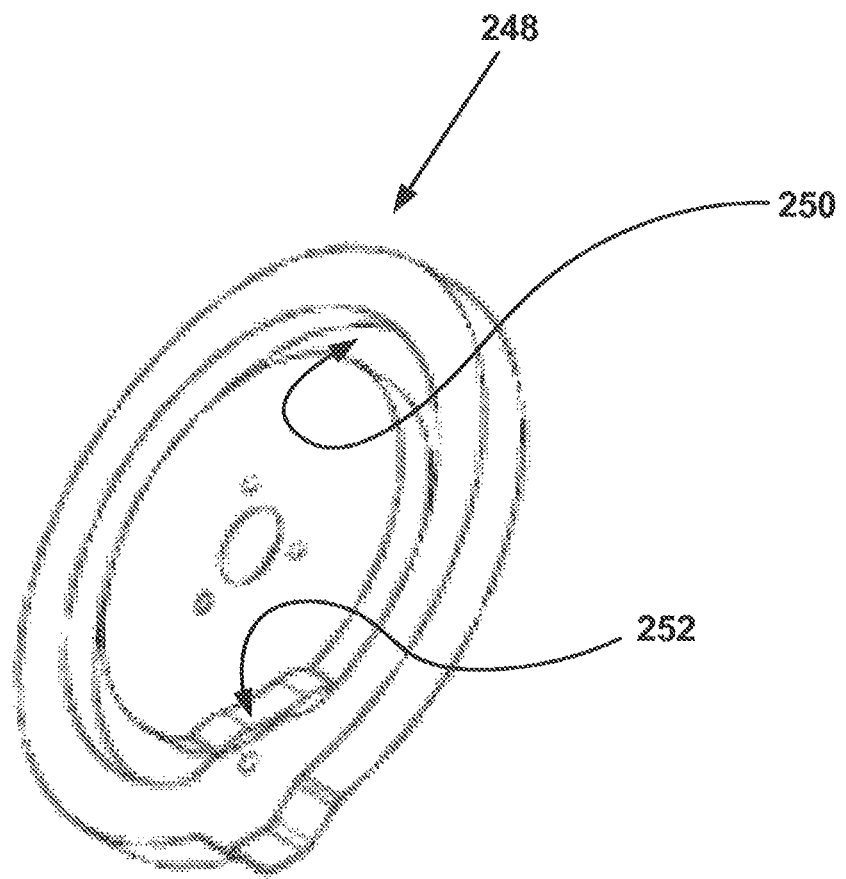
FIG. 16 shows a perspective view of the cam.

Referring now also to FIG. 16, a cam 248 is secured to the Geneva gear 238 so as to rotate therewith. A side surface of a center region of the cam 248 helps define an endless groove 250. The center region is substantially circular except for an indentation 252. Thus, the groove 250 has a radially-outer portion (outside the indentation 252) and a radially-inner portion (inside the indentation). A cam follower 254 (shown in FIG. 13) is disposed in the groove 250 and is secured to an arm 256 that is pivotally mounted at a first end to the shelf 208. A structure with a block 260 projecting therefrom is secured to a second end of the arm 256. The block 260 is movable between an engaged position and a disengaged position. In the engaged position, the block 260 extends beneath the hand crank gear 214, where it can be contacted by the block 218. In the disengaged position, the block 260 does not extend beneath the hand crank gear 214 and, thus, cannot be contacted by the block 218. The block 260 is moved between the engaged and disengaged positions by movement of the arm 256, which is controlled by the movement of the groove 250 relative to the cam follower 254. When the cam follower 254 is in the radially-outer portion of the groove 250, the arm 256 is stationary and keeps the block 260 in the disengaged position. When the cam follower 254 moves into the radially-inner portion of the groove 250 (relatively speaking), the cam follower 254 moves radially inward, which causes the arm 256 to pivot inward and move the block 260 to the engaged position. When the block 260 moves into the engaged position, it will be contacted by the block 218 on the hand crank gear 214 if the hand crank gear 214 completes its current revolution in its current direction and tries to continue moving in the same direction. The contact between the blocks 218, 260 prevents further movement of the hand crank gear 214 in its current direction and is considered a "mechanical hard stop".

The mechanical hard stop is implemented to prevent the tap changing assembly 12 from going from the 16R position through neutral and then to the 1R position, and to prevent the tap changing assembly 12 from going from the 16L position through neutral and then to the 1L position. In other words, the mechanical hard stop prevents a 360° or greater rotation of the first and second contact arms 58, 60 in one direction. Due to the contact location of the blocks 218, 260, the mechanical hard stop does not have to be implemented right at 16L and 16R. Instead, the main transmission shaft 122 may be permitted to rotate about another 90° past 16L and past 16R. The electronic hard stop and the mechanical hard stop may be configured to be implemented at about the same time. Alternately, the electronic hard stop and the mechanical hard stop may be configured so that one is implemented before the other. For example, the electronic hard stop and the mechanical hard stop may be configured so that the electronic hard stop is implemented first.

Since the cam 248 rotates 10 degrees for each tap change, the movement from neutral to 16L and from neutral to 16R, corresponds to rotation of the cam 248 of about 160°. Thus, the cam 248 is constructed and positioned such that the cam follower 254 will be in the radially-outer portion of the groove 250 for 160° of rotation of the cam 248 in either the CW or CCW direction from the neutral position and thereafter will enter the radially-inner portion (relatively speaking) to move the block 260 to the engaged position. Thus, the radially-inner portion of the groove comprises about 40° of the groove 250 and when the tap changing assembly 12 is in the neutral position, the center of the indentation 252 is disposed opposite the cam follower 254.

With particular reference to FIG. 8, a disc 262 of a multi-turn absolute encoder ("MTAE") 264 is connected to the first side shaft 232 so as to rotate therewith. The disc 262 is composed of glass or plastic and has a pattern formed thereon, such as by photographic deposition. The pattern comprises a series of radially-extending tracks. Each track is comprised of areas of different optical properties, such as areas of transparency and opaqueness. A detector unit 266 of the MTAE 264 reads these tracks as the disc 262 rotates and outputs a position signal representative of the angular position of the first side shaft 232. The detector unit 266 includes infrared emitters and receivers. The infrared emitters are mounted on one side of the disc 262 and the infrared receivers are mounted on the other side of the disc 262. When the disc 262 rotates, the light pattern of each track received by the infrared receivers produces a unique code that represents an absolute position of the first side shaft 232 over 360°.

A plurality of code carriers 267 of the MTAE 264 are also connected to the first side shaft 232 so as to rotate therewith, but in a sequentially geared down manner. Each of the code carriers 267 is a magnetic body comprised of alternating north and south poles. The magnetic fields generated by the rotation of the code carriers 267 are detected by the detector unit 266 to provide a measure of the number of rotations of the first side shaft 264.

Since the positions of the disc 262 and the code carriers 267 are not changed upon a power failure, the MTAE 264 effectively has a built-in memory that is maintained in the event of a power failure. In one embodiment of the present invention, the MTAE 264 can determine and store up to 4096 rotations of the first side shaft 232. Also in this embodiment, the MTAE 264 has 33,554,432 positions per revolution of the first side shaft 232. The absolute position of the first side shaft 232 over 360° and the measure of the number of rotations of the first side shaft 232 provide a "multi-turn position" (or simply "position") of the first side shaft 232. Through the relationships described herein, the position of the first side shaft 232 is used to determine the position of the main transmission shaft 122, the location of the tap changing assembly 12 within a tap change and the location of the tap changing assembly 12 among the taps, i.e., tap position.

The MTAE 264 is connected to the monitoring system 134 by a communication line, such as an EnDat 2.2 interface cable, which is a digital, bidirectional interface that is capable of transmitting the position of the first side shaft 232 from the MTAE 264 as well as transmitting or updating information stored in the MTAE 264 (such as diagnostic data). In addition to being connected to the MTAE 264, the monitoring system 134 is connected to the servo drive 126, a vacuum interrupter (VI) monitoring system 265 and miscellaneous other inputs, such as the environmental monitoring/control devices inside the housing 20. The monitoring system 134 is enclosed in a housing unit 268 (shown in FIG. 13) mounted inside the housing 20. The monitoring system 134 comprises the HMI 146, at least one microprocessor 270 and non-volatile memory 272, such as EEPROM. The HMI 146 includes a display and input devices, such as pushbutton keys of a membrane keypad.

Figure 17:
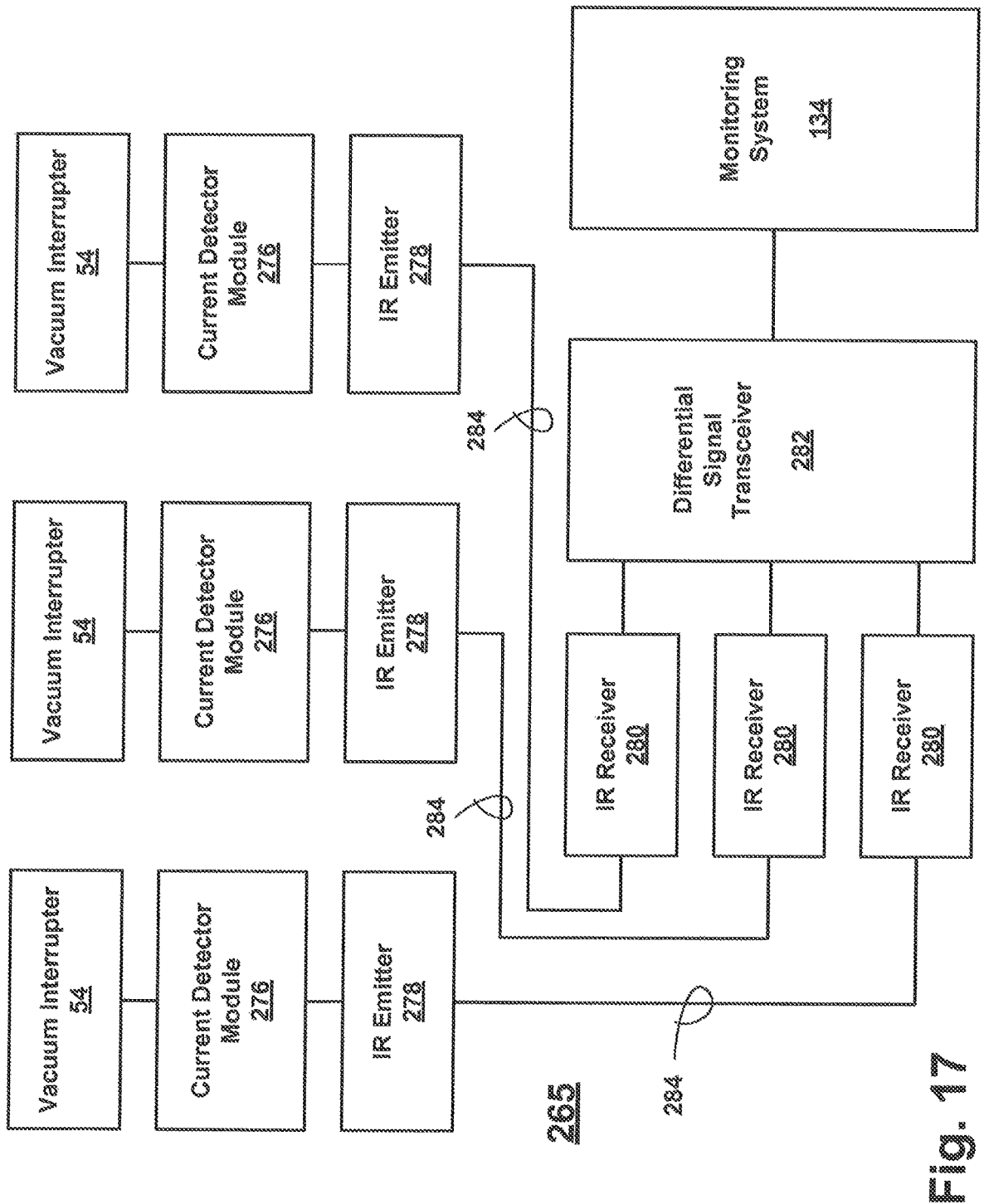
FIG. 17 shows a schematic view of a vacuum interrupter monitoring system.

Referring now to FIG. 17, there is shown a schematic drawing of the VI monitoring system 265, which generally includes three current detector modules 276 (one for each circuit 30), three infrared emitters 278 (one for each circuit 30), three infrared receivers 280 (one for each circuit 30) and a differential signal transceiver 282. In each circuit 30, the current detector module 276 is connected in series with the vacuum interrupter 54. When current above 6 amps passes through the vacuum interrupter 54, the current detector module 276 rectifies the sinusoidal current to generate electrical pulses having a frequency corresponding to the frequency of the current, which is in a range of from about 50 Hz to about 60 Hz. The rectification of the sinusoidal current may be full wave or half-wave rectification. In one embodiment of the present invention, the rectification of the sinusoidal current is half-wave so as to produce one pulse per Sine wave. The infrared emitter 278 converts the electrical pulses to light pulses and transmits them to the infrared receiver 280 over a fiber optic link 284. The infrared receiver 280 detects the pulses of light and generates a pulsed electrical signal in response thereto. This signal, which is single-ended signal, is then transmitted to the differential signal transceiver 282. As is known, a single-ended signal is transmitted over two wires, one of which carries a varying voltage that represents the signal, while the other of which is connected to a reference voltage, usually ground. The differential signal transceiver 282 converts the single-ended signal to a digital differential signal, i.e., two complementary signals that are transmitted on two separate wires. The differential signal transceiver 282 may be constructed in accordance with RS-422, RS-485 or Ethernet protocols. In one embodiment, the differential signal transceiver 282 is constructed in accordance with the RS-485 protocol, which defines the electrical characteristics of drivers and receivers for use in balanced digital multipoint systems. The conversion of the single-ended signal to the differential signal helps insulate the signal from environmental noise present in and around the tap changer 10.

Differential signals generated by the differential signal transceiver 282 are transmitted to the monitoring system 134 over wiring. Inside the monitoring system 134, differential signal receivers convert the differential signals back to single-ended signals, which are then provided to the microprocessor 270. The microprocessor 270 analyzes the timing of the signals and the phase relationship between the three signals to monitor and control a tap change. More specifically, during certain stages of a tap change, current should not be flowing through any of the vacuum interrupters 54 and in other stages of the tap change, current should be flowing through the vacuum interrupters 54 and should be separated by 120° between the phases. The presence of pulses in a signal for a vacuum interrupter 54 provides an indication to the microprocessor 270 that current is flowing through the vacuum interrupter 54. Conversely, the absence of pulses in a signal for a vacuum interrupter 54 provides an indication to the microprocessor 270 that current is not flowing through the vacuum interrupter 54. Since the pulses in the signals have a frequency corresponding to the frequency of the current through the vacuum interrupters 54, the offset of the pulses among the three signals (when current is flowing) should correspond to the 120° difference between the phases.

Figure 18:
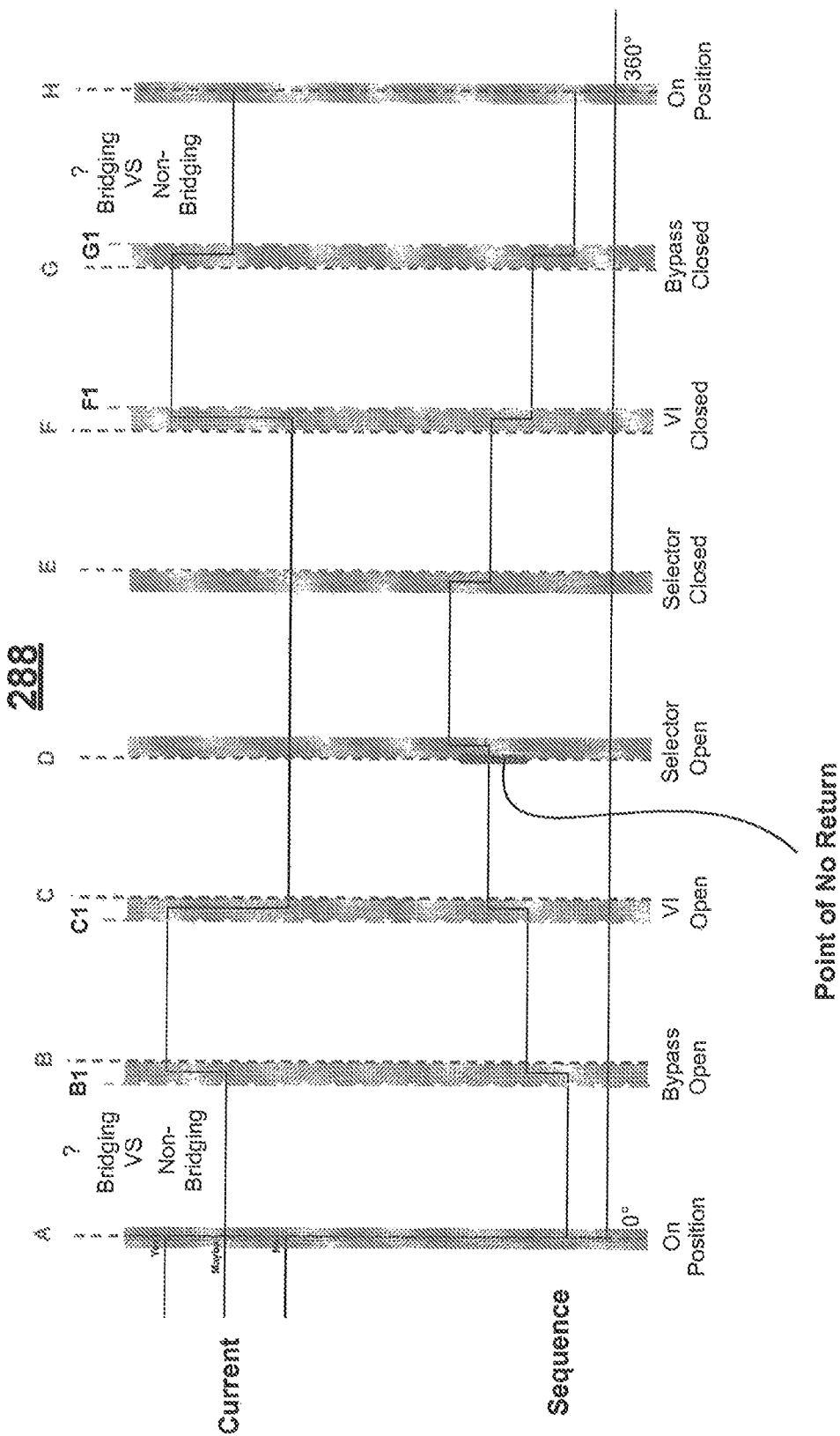
FIG. 18 shows a graphical representation of a tap change map stored in memory of the monitoring system.

Referring now to FIG. 18, there is shown a simplified graphical representation of a tap change map 288 that is stored in the memory 272 of the monitoring system 134 and that is used by the monitoring system 134 to control and/or monitor the operation of the tap changing assembly 12 during a tap change procedure. The map 288 includes stages or operations A-H delimited by dashed lines. The operations A-H correspond to "on position", "bypass switch open", "vacuum interrupter (VI) open", "selector switch open", "selector switch closed", "VI closed", "bypass switch closed" and "on position", respectively. The shaded blocks at the dashed lines indicate ±margins on degrees of rotation. The location of the tap changing assembly 12 within the map 288 is based on the position of the first side shaft 232, which is obtained from the position signal from the MTAE 264. The position just before operation D ("selector switch open") is designated as the point of no return ("PONR"). The selector switch (the first contact arm 58 or the second contact arm 60) is open when it is moved off a beginning tap (beginning stationary contact 56) as it is being moved to an ending tap (ending stationary contact 56) during a tap change. If the monitoring system 134 receives or generates an alarm at or after the PONR, the monitoring system 134 will cause the tap changing assembly 12 to complete the tap change and then will lock out the servo drive 126. If, however, the monitoring system 134 receives or generates an alarm before the PONR, the monitoring system 134 will cause the tap changing assembly 12 to stop the tap change, back-up to the previous tap position and then lock-out the servo drive 126.

The tap change map 288 stored in the memory 272 of the monitoring system 134 is more detailed than what is graphically shown in FIG. 18. The map 288 includes the operations A-H for a tap change from one tap to another. In addition, for the tap changes from 1L to N and N to 1L, the map 288 further includes data for the change-over switch 36, i.e., switch open and closed. For each operation, the map 288 includes the degrees of rotation of the first side shaft 232 at which the operation begins, the elapsed time (from the start of the tap change) at which the operation should be started, the change in elapsed time (time delta) that should occur from the beginning of the previous operation and the number of pulses that would/should be received from the VI monitoring system 265 during the time delta to indicate whether current is flowing through the relevant vacuum interrupter 54. Thus, the time delta is the time window within which the monitoring system 134 decides whether the tap change is proceeding properly (with regard to current through the vacuum interrupter 54). The elapsed time values stored in the map 288 are in milliseconds. In this regard, it is noted that the monitoring system 134 is programmed to control the servo motor 124 to perform a tap change in one of two time periods, namely 1 second and 2 seconds. Thus, the map 288 includes the data for the operations described above for either a 1 second tap change or a 2 second tap change. However, the values for the map 288 can be changed from those for a 1 second tap change to those for a 2 second tap change and vice versa in the factory where the tap changer 10 is manufactured or by authorized maintenance personnel in the field when the tap changer 10 is shut down for maintenance. In another embodiment of the invention, the map 288 includes the data for the operations described above for both a 1 second tap change and a 2 second tap change and a user may select a 1 second tap change or a 2 second tap change through the HMI 146 or from a remote location.

It should be noted that in addition to the map 288, the speed of rotation of the motor shaft 174 for a 1 second tap change and/or a 2 second tap change is/are stored in the memory 272. In addition, the plus and minus feedback units that are used to implement the electronic hard stop are stored in the memory 272. The stored speed for the programmed/selected tap change (1 or 2 second) is provided to the servo drive 126 (i.e., the speed register 189) in the event power is cut-off to the servo drive 126, as described in more detail below. Similarly, the plus and minus feedback units for implementing the electronic hard stop are provided to the servo drive 126 (i.e., the plus stop register 190 and the minus stop register 191, respectively) in the event power is cut-off to the servo drive 126, also as described in more detail below.

Figure 19:
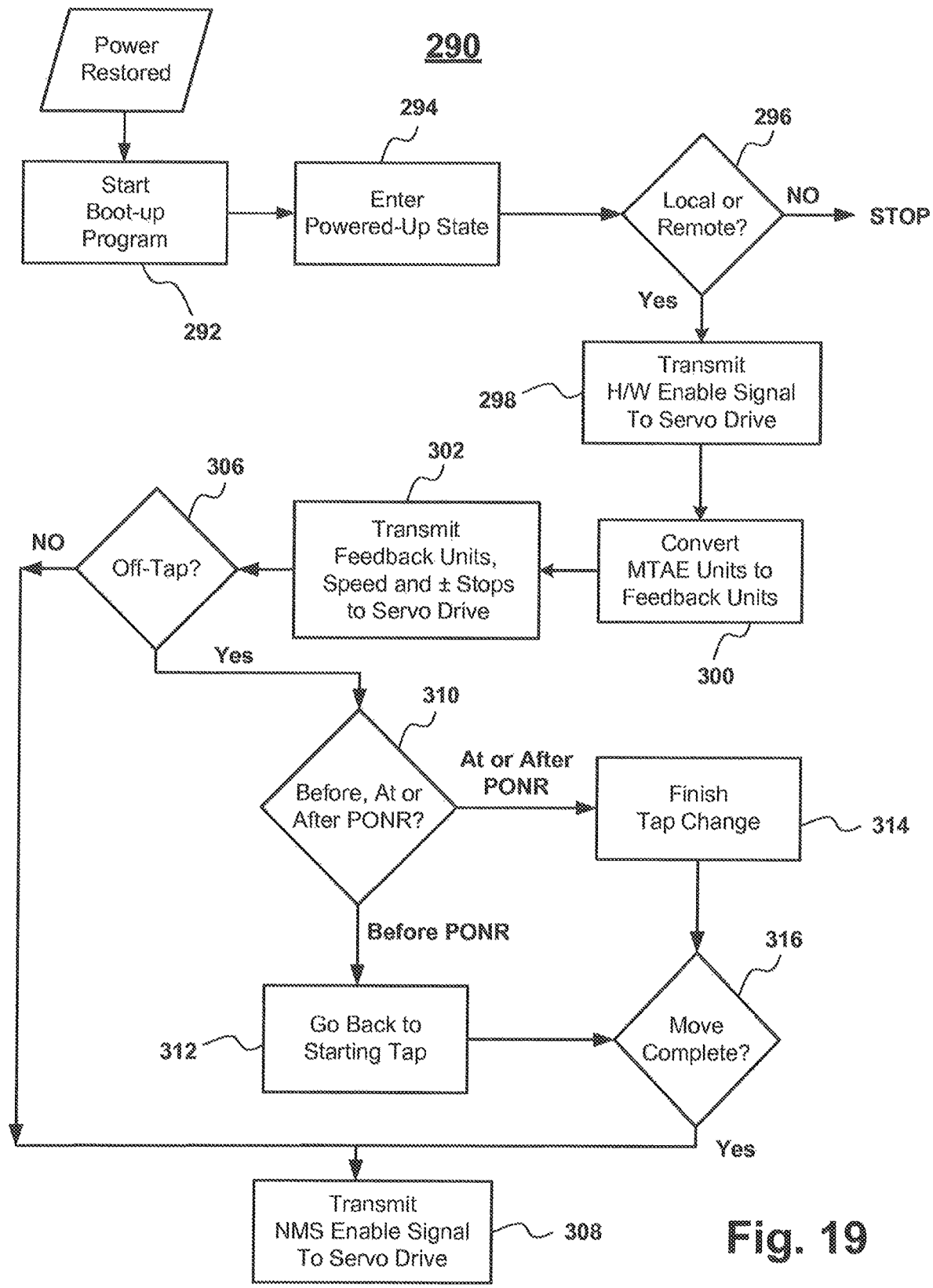
FIG. 19 shows a flow chart of a power restoration routine performed by the monitoring system.
Figure 20:
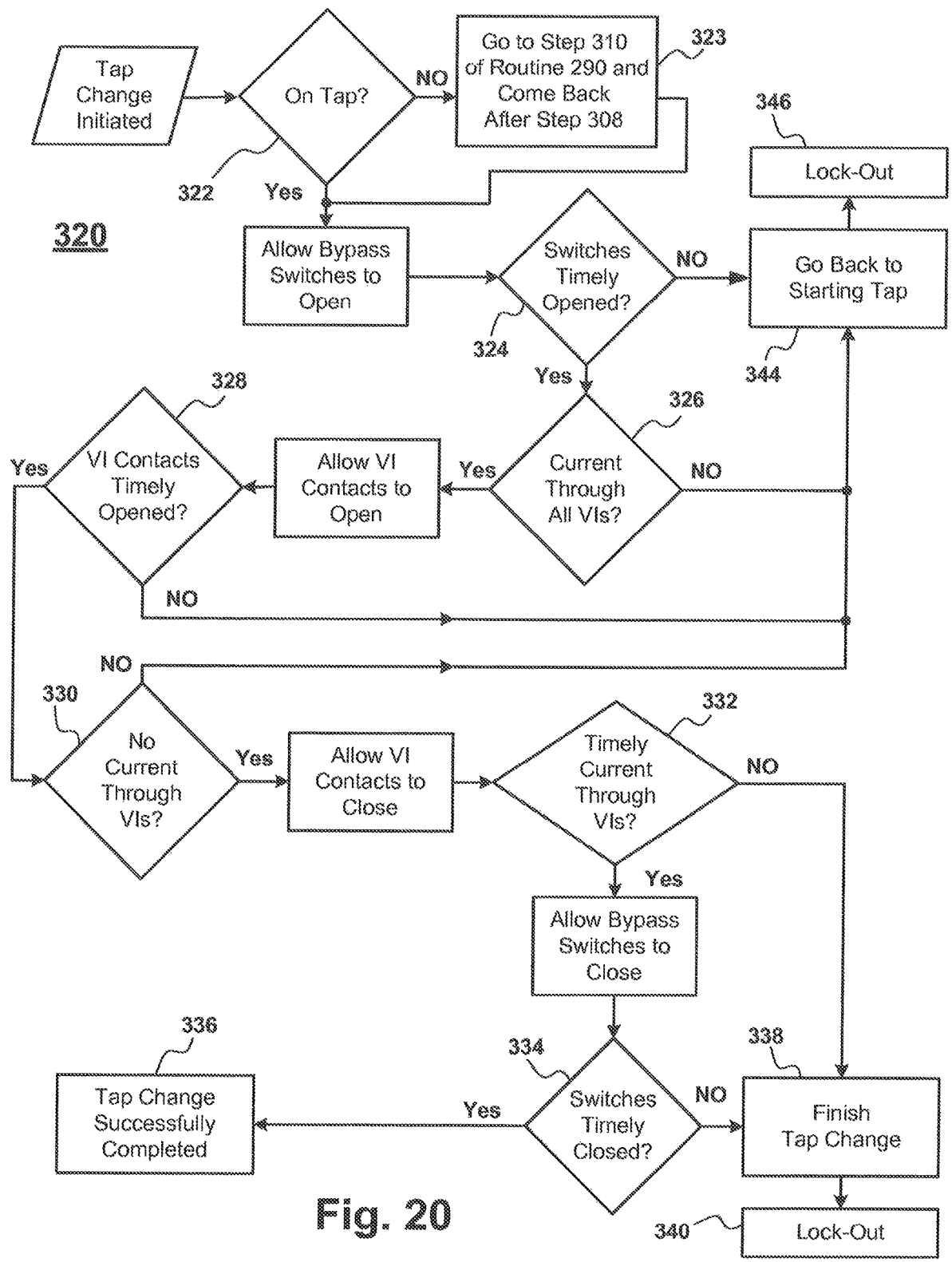
FIG. 20 shows a flow chart of a first monitoring routine that may be performed by the monitoring system.

The monitoring system 134 performs software-implemented routines for monitoring and controlling the operation of the tap changing assembly 12. The software code for these routines is stored in memory 272 of the monitoring system 134 and is executed by the microprocessor 270. One of the routines is a power restoration routine 290 (shown in FIG. 19) that is implemented when power to the monitoring system 134 and/or the servo drive 126 is cut-off and then restored. As set forth above, when power to the servo drive 126 is lost, all of the data stored in the speed register 189, the plus stop register 190, the minus stop register 191 and the feedback register 192 is lost and upon restoration of power, the values in the registers are set to zero. When power to the monitoring system 134 is restored after a power failure, a boot-up program is automatically initiated in step 292 of the power restoration routine 290. The boot-up program performs a start-up procedure that includes: (i.) reading parameters from memory 272, (ii.) establishing communication with the servo drive 126 (iii.) establishing communication with the MTAE 264, (iv.) determining the current tap position of the tap changing assembly 12 based on information from the MTAE 264, (v.) setting up an event log and (vi.) outputting 4-20 mA signals representative of the current tap position to the automatic voltage regulator for the transformer. Although communication is established with the servo drive 126, the monitoring system 134 does not provide the H/W enable signal or the NMS enable signal to the servo drive 126.

Once the boot-up program is finished running, a powered-up state is entered in step 294. The powered-up state has four sub-states or modes that are determined by the switch, namely: local, hand crank, remote and off. The three inputs (local, hand crank and remote) from the switch are mutually-exclusive. If none of these three inputs is asserted, the "off" sub-state is entered.

After the monitoring system 134 enters the powered-up state, a determination is made in step 296 whether the monitoring system 134 is in the local mode or the remote mode. If the monitoring system 134 is in either the local mode or the remote mode, the routine 290 proceeds to step 298, wherein the H/W enable signal is transmitted to the servo drive 126 via digital inputs over the drive interface 202. After step 298, the monitoring system 134 proceeds to step 300, wherein the position (0-360° and number of rotations) of the first side shaft 232 measured by the MTAE 264 is converted to the position units (e.g., counts) of the motor shaft 174 measured by the feedback device 180, i.e., the position units of the motor shaft 174 are calculated from the position output by the MTAE 264. The calculated position units are then transmitted to the servo drive 126 over the CAN bus 200 in step 302 and are stored in the feedback register 192 therein. Also in step 302, the values for the speed of rotation of the motor shaft 174 and the plus and minus feedback units for implementing the electronic hard stop are transmitted to the servo drive 126 over the CAN bus 200 and are stored in the speed register 189, the plus stop register 190 and the minus stop register 191, respectively. Next, the monitoring system 134 proceeds to step 306 in which the routine 290 determines whether the tap changing assembly 12 is off-tap, i.e., is in-between taps, using information from the MTAE 264. If the tap changing assembly 12 is not off-tap, the routine proceeds directly to step 308. If, however, the tap changing assembly 12 is off-tap, the monitoring system 134 proceeds to step 310, wherein the monitoring system 134 determines if the tap changing assembly 12 is before the PONR, or is at or past the PONR. If the tap changing assembly 12 is before the PONR, the monitoring system 134 sends an instruction in step 312 over the CAN bus 200 to the servo drive 126 to control the servo motor 124 to move the tap changing assembly 12 back to the previous tap. If the tap changing assembly 12 is at or after the PONR, the monitoring system 134 sends an instruction in step 314 over the CAN bus 200 to the servo drive 126 to control the servo motor 124 to move the tap changing assembly 12 forward to the next tap. After step 312 or step 314, the monitoring system 134 proceeds to step 316, wherein the monitoring system 134 polls the servo drive 126 to determine if the move of the tap changing assembly 12 is complete. If so, the monitoring system 134 proceeds to step 308 in which an NMS enable signal is transmitted to the servo drive 126 via digital inputs over the drive interface 202. At this point, the tap changing assembly 12 is in the powered up-remote mode-normal operation or the powered up-local mode-normal operation, as the case may be.

If only the servo drive 126 loses power, the boot-up program is not initiated and the power restoration routine begins in step 298.

It should also be noted that when the monitoring system 134 is in the hand crank mode or the off mode and then is moved to either the local mode or the remote mode, the monitoring system 134 performs steps 298 and thereafter. This occurs, regardless whether there was a power failure or not.

In addition to performing the power restoration routine 290, the monitoring system 134 also performs a monitoring routine 320 that oversees each tap change operation. The monitoring system 134 uses the tap change map 288 stored in memory 272, the position of the first side shaft 232 from the MTAE 264 and information from the VI monitoring system 265 to perform the monitoring routine 320. When a command for a tap change is made (e.g., a raise command is issued from the lower/raise switch 152), the monitoring system 134, in step 322, first determines whether the tap change is beginning from a valid tap position. If the tap changing assembly 12 is off-tap, the monitoring system 134 proceeds to step 323, wherein the monitoring system 134 negates the NMS enable signal to the servo drive 126 and then goes back to routine 290 and performs step 310 and the steps thereafter. Upon completion of step 308, the monitoring system 134 returns to the routine 320 and then allows the tap change to proceed to open the bypass switches (66 or 68) in operation B. If the tap changing assembly is determined to be on-tap in step 322, the monitoring system 134 allows the tap change to directly proceed to open the bypass switches (66 or 68) in operation B. The monitoring system 134, in step 324, determines if the bypass switches (66 or 68) have opened (as determined from the position of the first side shaft 232) within a predetermined period of time from the start of the tap change. If the bypass switches have timely opened, the monitoring system 134 proceeds to step 326, wherein the monitoring system 134 determines if current is flowing through all of the vacuum interrupters 54. If current is flowing through all of the vacuum interrupters 54, the monitoring system 134 allows the tap change to proceed to open the contacts of the vacuum interrupters 54 in operation C. The monitoring system 134, in step 328, determines if the contacts of the vacuum interrupters 54 have been opened (as determined from the position of the first side shaft 232) within a predetermined period of time from the bypass switches (66 or 68) being opened. If the contacts of the vacuum interrupters 54 have timely opened, the monitoring system 134 proceeds to step 330 to determine if no current is flowing through any of the vacuum interrupters 54. If the contacts of the vacuum interrupters 54 have timely opened and no current is flowing through the vacuum interrupters 54, the monitoring system 134 allows the tap change to continue to move the first contact arms 58 or the second contact arms 60 to the next tap and to close the contacts of the vacuum interrupters 54. In step 332, the monitoring system 134 determines if current is flowing through the vacuum interrupters 54 within a predetermined period of time from the closing of the contacts of the vacuum interrupters 54 (as determined from the position of the first side shaft 232). If current is flowing through the vacuum interrupters 54 within the predetermined period of time from the closing of the contacts of the vacuum interrupters 54, the monitoring system 134 allows the tap change to continue to close the bypass switches (66 or 68). In step 334, the monitoring system 134 determines if the bypass switches (66 or 68) have closed (as determined from the position of the first side shaft 232) within a predetermined period of time from the closing of the contacts of the vacuum interrupters 54. If the bypass switches (66 or 68) have timely closed, the monitoring system 134 determines in step 336 that the tap change has been successfully completed.

If, during the foregoing monitoring routine 320, any of the determinations is negative, the monitoring system 134 will first either stop the tap change and go back to the starting tap or complete the tap change, depending on where the negative determination is, and then will lock-out the servo drive 126. If the determination is negative at step 332 or thereafter, the monitoring system 134 will instruct the servo drive 126 to complete the tap change in step 338 and then lock-out the servo drive 126 in step 340. If the determination is negative at step 330 or earlier, the monitoring system 134 will instruct the servo drive 126 to stop the tap change and go back to the starting tap in step 344 and then lock-out the servo drive 126 in step 346.

After each determination in the monitoring routine 320, the monitoring system 134 makes an entry in the event log describing the outcome of the determination. For some of the negative determinations, the monitoring system 134 will include in the entry the likely cause of the problem. For example if there is a negative determination in step 324, the monitoring system 134 will include in the event log entry that there is a bypass switch failure.

After a tap change has been successfully performed, the monitoring system 134 monitors the servo drive 126 to ensure that the servo drive 126 is keeping the servo motor 124 in place so as to maintain the current tap position. If the monitoring system 134 sees the output of the servo drive 126 move within a predetermined amount of deviation, the monitoring system 134 will move the output of the servo drive 126 back. If, however, the output of the servo drive 126 moves beyond the predetermined amount of deviation, the monitoring system 134 will issue an alarm and lock-out the servo drive 126.

Figure 21:
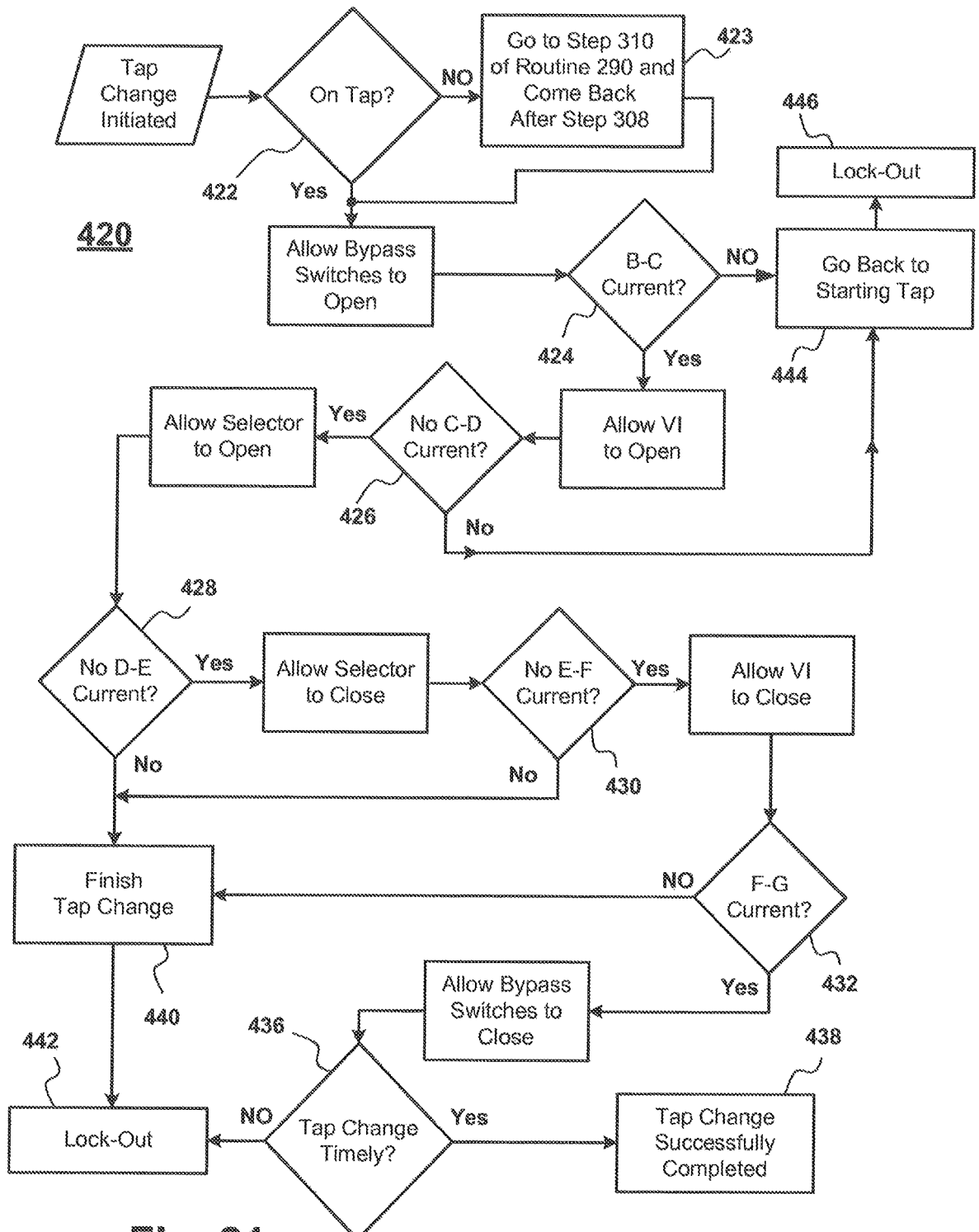
FIG. 21 shows a flow chart of a second monitoring routine that may be performed by the monitoring system.

In lieu of the monitoring routine 320, other monitoring routines may be implemented to oversee a tap change operation. For example, in another embodiment, a monitoring routine 420 may be implemented, as shown in FIG. 21. When a command for a tap change is made (e.g., a raise command is issued from the lower/raise switch 152), the monitoring system 134, in step 422, first determines whether the tap change is beginning from a valid tap position. If the tap changing assembly 12 is off-tap, the monitoring system 134 proceeds to step 423, wherein the monitoring system 134 negates the NMS enable signal to the servo drive 126 and then goes back to routine 290 and performs step 310 and the steps thereafter. Upon completion of step 308, the monitoring system 134 returns to the routine 420 and then allows the tap change to proceed to open the bypass switches (66 or 68). If the tap changing assembly is determined to be on-tap in step 422, the monitoring system 134 allows the tap change to directly proceed to open the bypass switches (66 or 68) in operation B. In step 424, the monitoring system 134 determines whether current is detected through all of the vacuum interrupters 54 for a minimum amount of time in the period between operations B and C. If current is detected through all of the vacuum interrupters 54 for the minimum amount of time, the monitoring system 134 allows the tap change to proceed to open the contacts of the vacuum interrupters 54 in operation C. In step 426, the monitoring system 134 determines if no current is detected through all of the vacuum interrupters 54 in the period between operations C and D. If no current is detected through all of the vacuum interrupters 54, the monitoring system 134 allows the tap change to proceed to open the first contact arms 58 or the second contact arms 60 in operation D, i.e., to move the first contact arms 58 or the second contact arms 60 off the beginning taps (beginning stationary contacts 56) in the tap change. In step 428, the monitoring system 134 determines if no current is detected through all of the vacuum interrupters 54 in the period between operations D and E. If no current is detected through all of the vacuum interrupters 54, the monitoring system 134 allows the tap change to proceed to close the first contact arms 58 or the second contact arms 60 in operation E, i.e., to move the first contact arms 58 or the second contact arms 60 into engagement with the ending taps (ending stationary contacts 56) in the tap change. In step 430, the monitoring system 134 determines if no current is detected through all of the vacuum interrupters 54 in the period between operations E and F. If no current is detected through all of the vacuum interrupters 54, the monitoring system 134 allows the tap change to proceed to close the contacts of the vacuum interrupters 54 in operation F. In step 432, the monitoring system 134 determines whether current is detected through all of the vacuum interrupters 54 for a minimum amount of time in the period between operations F and G. If current is detected through all of the vacuum interrupters 54 for the minimum amount of time, the monitoring system 134 allows the tap change to proceed to close the bypass switches (66 or 68) in operation G and complete the tap change in operation H. In step 436, the monitoring system 134 determines whether the entire tap change was accomplished within a required amount time, which is a little less than 1 second for a 1-second tap and a little less than 2 seconds for a 2-second tap change. If the tap change was timely completed, the monitoring system 134 determines that the tap change was successfully completed in step 438. If the tap change was not timely completed, the monitoring system 134 determines that there is a problem and locks-out the servo drive 126 in step 442.

If, during the foregoing monitoring routine 420, any of the determinations is negative, the monitoring system 134 will first either stop the tap change and go back to the starting tap or complete the tap change, depending on where the negative determination is, and then will lock-out the servo drive 126. If the determination is negative at step 428 or thereafter, the monitoring system 134 will instruct the servo drive 126 to complete the tap change in step 440 and then lock-out the servo drive 126 in step 442. If the determination is negative at step 426 or earlier, the monitoring system 134 will instruct the servo drive 126 to stop the tap change and go back to the starting tap in step 444 and then lock-out the servo drive 126 in step 446.

Unlike the monitoring routine 320, the monitoring routine 420 does not check the timing of operations during the performance of the tap change. The routine 420 only checks the overall timing of the tap change at its conclusion in step 436. It should be appreciated that the routine 420 may be modified to further include one or more timing checks during the performance of the tap change. For example, a timing determination may be made before the PONR, such as whether the contacts of the vacuum interrupters 54 opened in operation C within a predetermined amount of time of the start of the tap change in operation A. If the contacts of the vacuum interrupters 54 did not open within the predetermined amount of time, the monitoring system 134 would proceed to step 444 and then lock-out the servo drive 126 in step 446. In addition, or alternately, a timing determination can be made after the PONR. For example, a determination could be made whether the contacts of the vacuum interrupters 54 closed in operation F within a predetermined amount of time of the closing of the first contact arms 58 or the second contact arms 60 in operation E. If the contacts of the vacuum interrupters 54 did not close within the predetermined amount of time, the monitoring system 134 would proceed to step 440 and then lock-out the servo drive 126 in step 442.

In the foregoing descriptions of the routines 320, 420, the references to the monitoring system 134 allowing the tap change to continue after a determination should not be construed as meaning that the tap change procedure waits for the monitoring system 134 to make its determination before the tap change procedure continues. The tap change proceeds in a continuous manner and the monitoring system 134 makes its determinations within the time deltas between the various operations. The tap change is stopped only if an error is detected.

In addition to the monitoring routine 320 or 420, the monitoring system 134 performs other monitoring activities, as well. For example, the monitoring routine 134 continuously monitors the position of the first side shaft 232 measured by the MTAE 264 and the position of the motor shaft 174 measured by the feedback device 180. If the two measurements don't match (after conversion), the monitoring system 134 will generate an alarm and lock-out the servo drive 126 (after allowing a tap change to continue or move back to a starting tap, as the case may be). The monitoring system 134 also monitors the three signals from the VI monitoring system 265 to ensure that the offset of the pulses among the three signals (when current is flowing) correspond to the 120° difference between the phases. If they don't, the monitoring system 134 will generate an alarm. In addition to generating an alarm, the monitoring system 134 may also lock-out the servo drive 126, as described above.

Another operation performed by the monitoring system 134 is a return-to-neutral operation. The return-to-neutral operation can be performed when the monitoring system 134 is in either the local mode or the remote mode. When this operation is initiated, the monitoring system 134 causes the servo motor 126 to move the tap changing assembly 12 to the neutral position, no matter where the tap changing assembly 12 is currently located. The return-to-neutral operation can be initiated by an operator actuating the return-to-neutral switch 150 on the swing plate 138, or by a activation of a return-to-neutral switch located in a remote location, such as a control room or a nearby control cabinet.

A further operation performed by the monitoring system 134 is a jog operation, which can only be performed when the monitoring system 134 is in the local mode. The jog operation is performed in conjunction with a lower/raise operation, which will be described first. The lower/raise operation can be performed in a continuous mode (which is the default) or in a step-by-step mode. The lower/raise operation can be performed using the lower/raise switch 152 on the swing plate 138 when the monitoring system 134 is in the local mode, or a lower/raise switch in a remote location when the monitoring system 134 is in the remote mode. When a lower/raise switch is actuated in the continuous mode, the tap changing assembly 12 continues to make tap changes (to lower or raise the voltage across the main winding 34, depending on whether the switch is actuated to lower or raise) for so long as the switch is held in the actuated position. When a lower/raise switch is actuated in the step-by-step mode, the tap changing assembly 12 only makes one tap change (to lower or raise the voltage across the main winding 34, depending on whether the switch is actuated to lower or raise) no matter how long the switch is held in the actuated position. In order to make another tap change, the switch must be moved to its off state and then actuated again to raise or lower. The jog operation is initiated by an operator first actuating a jog button in the HMI 146 and then actuating the lower/raise switch 152 on the swing plate 138. When the jog operation is initiated, the monitoring system 134 causes the servo drive 126 to move the servo motor 124 at a much slower rate than when a normal raise/lower operation is performed. For comparison, the speed of the motor shaft 174 during a 1 second tap change is 1300 RPM and during a 2 second tap change is 650 RPM. During the jog operation, the speed of the motor shaft 174 is about 150 RPM. Thus, the speed of the motor shaft 174 during the jog operation is about 8.6 times slower than a 1 second tap change.

Still another operation performed by the monitoring system 134 is a transformer turns ratio (TTR) operation. The TTR operation can be performed when the monitoring system 134 is in either the local mode or the remote mode. When the TTR operation is initiated, the monitoring system 134 causes the servo motor 126 to move the tap changing assembly 12 through a predetermined sequence of tap changes for testing purposes. The predetermined sequence may be from neutral to 16R, then back to neutral and then 1-16L, or only from neutral to 16R, or only from neutral to 16L, or some other sequence. As with the jog operation, the TTR operation is performed in conjunction with a lower/raise operation. More specifically, a TTR pushbutton in the HMI 146 or a TTR pushbutton in a remote location is first actuated. Then the lower/raise switch 152 on the swing plate 138 or a remote lower/raise switch is actuated. Regardless whether the lower/raise switch is actuated to raise or lower, the monitoring system 134 causes the servo motor 126 to move the tap changing assembly 12 through the predetermined sequence of tap changes.

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. An on-load tap changer for making tap changes in a transformer winding, the tap changer comprising:
    a tap change module configured to be connected to the transformer winding and comprising a bypass switch assembly, a vacuum interrupter assembly and a selector switch assembly;
    a motor connected to rotate at least one shaft, wherein the at least one shaft is connected to the tap change module and is operable upon rotation to cause the tap change module to perform a sequence of operations that effectuate a tap change, the operations comprising actuating the bypass switch assembly, actuating the vacuum interrupter assembly and actuating the selector switch assembly;
    a multi-turn absolute encoder connected to the at least one shaft and operable to determine a position of the at least one shaft; and
    a monitoring system connected to the encoder to receive the position of the at least one shaft and operable to monitor a tap change by determining from the position of the at least one shaft where the tap change module is in the sequence of operations.

2. The on-load tap changer of claim 1, wherein the at least one shaft comprises a motor shaft connected by a transmission shaft to the tap change module; and
    wherein the encoder is connected to the motor shaft and is operable to determine the position of the motor shaft.

3. The on-load tap changer of claim 1, wherein the at least one shaft comprises a motor shaft, a transmission shaft connected between the motor shaft and the tap change module, and a first side shaft connected by at least one gear to the transmission shaft so as to rotate therewith; and
    wherein the multi-turn absolute encoder is connected to the first side shaft and is operable to determine the position of the first side shaft.

4. The on-load tap changer of claim 3, wherein the position of the first side shaft comprises the number of rotations of the first side shaft and the angular position of the first side shaft from 0-360 degrees.

5. The on-load tap changer of claim 1, wherein the selector switch assembly comprises a pair of movable contacts and a plurality of fixed contacts configured to be electrically connected to taps of the transformer winding, respectively;
    wherein the movable contacts are movable among a plurality of different tap positions, wherein in each tap position, the movable contacts are both connected to the same fixed contact or are connected to adjacent fixed contacts, respectively; and
    wherein the monitoring system is operable to determine the tap position of the movable contacts from the position of the at least one shaft.

6. The on-load tap changer of claim 1, wherein the monitoring system is operable to control the motor to perform a tap change within a user-selectable predetermined period of time.

7. A method for making tap changes in a transformer winding, the method comprising:
    operating a motor to rotate a shaft connected to a tap change module;
    in response to rotation of the shaft, effectuating a sequence of tap change operations by a tap change module connected to the transformer winding, the tap change operations comprising:
    actuating a bypass switch assembly of the tap change module;
    actuating a vacuum interrupter assembly of the tap change module; and
    actuating a selector switch assembly of the tap change module;
    determining, by a multi-turn absolute encoder connected to the shaft, a position of the shaft;
    receiving, by a monitoring system connected to the encoder, the position of the shaft; and
    determining, by the monitoring system based on the position of the shaft, where the tap change module is in the sequence of tap change operations.

8. The method of claim 7, wherein the shaft comprises a motor shaft connected by a transmission shaft to the tap change module; and
    wherein determining the position of the shaft comprises determining, by the encoder, a position of the motor shaft.

9. The method of claim 7, wherein the shaft comprises:
a motor shaft;
a transmission shaft connected between the motor shaft and the tap change module; and
a first side shaft connected by at least one gear to the transmission shaft so as to rotate therewith, wherein the multi-turn absolute encoder is connected to the first side shaft, and
wherein determining the position of the shaft comprises determining by the encoder, the position of the first side shaft.

10. The method of claim 9, wherein determining the position of the first side shaft comprises:
determining a number of rotations of the first side shaft; and
determining an angular position of the first side shaft from 0-360 degrees.

11. The method of claim 7, wherein the selector switch assembly comprises a pair of movable contacts and a plurality of fixed contacts electrically connected to taps of the transformer winding, respectively,
    wherein the movable contacts are movable among a plurality of different tap positions, wherein in each tap position, the movable contacts are both connected to the same fixed contact or are connected to adjacent fixed contacts, respectively, the method further comprising:
determining, by the monitoring system based on the position of the shaft, the tap position of the movable contacts.

12. The method of claim 7, further comprising:
selecting, by a user, a predetermined period of time; and
controlling, by the monitoring system, the motor to perform a tap change within the predetermined period of time.

13. The method of claim 7, further comprising:
measuring a time required to perform at least one of the tap change operations;
determining, based on the time required, whether the at least one of the tap change operations was timely performed; and
determining that an error has occurred in response to determining that the at least one of the tap change operations was not timely performed.

14. The method of claim 7, further comprising:
determining whether a current flowing through the vacuum interrupter assembly is properly present or absent after at least one of the tap change operations has been completed; and
determining that an error has occurred based on determining that the current is not properly present or absent after the at least one of the tap change operations has been completed.

15. The method of claim 7, wherein the selector switch assembly comprises a pair of movable contacts and a plurality of fixed contacts electrically connected to taps of the transformer winding, respectively, and
    wherein the movable contacts are movable from being connected to a beginning tap of the transformer winding to being connected to an ending tap of the transformer winding during a tap change, the method further comprising:
determining, by the monitoring system, that an error has occurred; and
controlling, by the monitoring system in response to the error, the motor to either continue the tap change and move the movable contacts to being connected to the ending tap, or to cancel the tap change and move the movable contacts back to being connected to the beginning tap, based on where the tap change module is in the sequence of tap change operations.

16. The method of claim 15, further comprising controlling, by the monitoring system in response to the error, the motor to either continue the tap change or to cancel the tap change, thereby cutting off power to the motor.

17. The method of claim 15, wherein the bypass switch assembly comprises a bypass switch,
    wherein the vacuum interrupter assembly comprises a vacuum interrupter having a pair of contacts disposed in a vacuum bottle, and
    wherein the sequence of tap change operations further comprises:
opening the bypass switch;
opening the contacts of the vacuum interrupter after opening the bypass switch;
moving the movable contacts from the beginning tap to the ending tap after opening the contacts;
closing the contacts of the vacuum interrupter after moving the movable contacts; and
closing the bypass switch after closing the contacts of the vacuum interrupter.

18. The method of claim 17, further comprising, in response to determining an error has occurred before closing the bypass switch has been completed, cancelling, by the monitoring system, the tap change and moving the movable contacts back to the beginning tap.

19. The method of claim 17, further comprising determining, after opening the bypass switch and before opening the contacts of the vacuum interrupter:
determining whether current is flowing through the vacuum interrupter; and
in response to determining that current is not flowing through the vacuum interrupter, determining, by the monitoring system, that an error has occurred.

20. An on-load tap changer system comprising:
a transformer winding; and
a tap changer subassembly comprising:
    a tap change module connected to the transformer winding and comprising a bypass switch assembly, a vacuum interrupter assembly and a selector switch assembly;
    a motor connected to rotate at least one shaft, wherein the at least one shaft is connected to the tap change module and is operable upon rotation to cause the tap change module to perform a sequence of operations that effectuate a tap change, the operations comprising actuating the bypass switch assembly, actuating the vacuum interrupter assembly and actuating the selector switch assembly;
    a multi-turn absolute encoder connected to the at least one shaft and operable to determine a position of the at least one shaft; and
    a monitoring system connected to the encoder to receive the position of the at least one shaft and operable to monitor a tap change by determining from the position of the at least one shaft where the tap change module is in the sequence of operations.

* * * * *